(12) United States Patent
Tu et al.

(10) Patent No.: US 8,073,954 B1
(45) Date of Patent: Dec. 6, 2011

(54) METHOD AND APPARATUS FOR A SECURE REMOTE ACCESS SYSTEM

(75) Inventors: Edgar Allen Tu, Castor Valley, CA (US); Eric Pang, Sunnyvale, CA (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 3608 days.

(21) Appl. No.: 09/618,954

(22) Filed: Jul. 19, 2000

(51) Int. Cl.
*G06F 13/00* (2006.01)

(52) U.S. Cl. ........................ 709/227; 709/203

(58) Field of Classification Search .................. 709/203, 709/217–219, 226, 224, 223, 227; 718/105, 718/102, 104
See application file for complete search history.

(56) References Cited

U.S. PATENT DOCUMENTS

| | | | | |
|---|---|---|---|---|
| 4,887,212 A | 12/1989 | Zamora et al. | ................ | 364/419 |
| 5,111,398 A | 5/1992 | Nunberg et al. | ............. | 364/419 |
| 5,115,466 A | 5/1992 | Presttun | | |
| 5,130,993 A | 7/1992 | Gutman et al. | ................ | 371/42 |
| 5,146,221 A | 9/1992 | Whiting et al. | ................ | 341/67 |
| 5,329,619 A | 7/1994 | Page et al. | .................... | 395/200 |
| 5,392,390 A | 2/1995 | Crozier | .......................... | 395/161 |
| 5,418,854 A | 5/1995 | Kaufman et al. | ............. | 713/156 |
| 5,418,908 A | 5/1995 | Keller et al. | ................... | 395/200 |
| 5,425,079 A | 6/1995 | Noda et al. | | |
| 5,483,352 A | 1/1996 | Fukuyama | .................... | 358/402 |
| 5,485,161 A | 1/1996 | Vaughn | .................... | 342/357.13 |
| 5,519,433 A | 5/1996 | Lappington et al. | ......... | 725/110 |
| 5,519,606 A | 5/1996 | Frid-Nielsen et al. | ........ | 364/401 |
| 5,543,789 A | 8/1996 | Behr et al. | .................... | 340/995 |
| 5,544,061 A | 8/1996 | Morimoto et al. | ............ | 340/995 |
| 5,561,446 A | 10/1996 | Montlick | ....................... | 345/173 |
| 5,574,906 A | 11/1996 | Morris | | |
| 5,579,489 A | 11/1996 | Dornier et al. | | |
| 5,588,009 A | 12/1996 | Will | ............................. | 371/33 |
| 5,592,470 A | 1/1997 | Rudrapatna et al. | | |
| 5,623,406 A | 4/1997 | Ichbiah | ................. | 364/999.999 |
| 5,623,661 A | 4/1997 | Hon | .............................. | 395/601 |
| 5,628,005 A | 5/1997 | Hurvig | .......................... | 395/608 |
| 5,630,081 A | 5/1997 | Rybicki et al. | ................ | 395/348 |
| 5,638,508 A | 6/1997 | Kanai et al. | .................... | 714/20 |
| 5,640,577 A | 6/1997 | Scharmer | ..................... | 395/765 |
| 5,644,709 A | 7/1997 | Austin | | |
| 5,647,002 A | 7/1997 | Brunson | ......................... | 380/49 |
| 5,649,195 A | 7/1997 | Scott et al. | ..................... | 395/617 |
| 5,650,800 A | 7/1997 | Benson | | |
| 5,666,397 A | 9/1997 | Lamons et al. | | |
| 5,666,553 A | 9/1997 | Crozier | ......................... | 395/803 |
| 5,682,524 A | 10/1997 | Freund et al. | ................. | 395/605 |

(Continued)

FOREIGN PATENT DOCUMENTS

CN     1202662     12/1998

(Continued)

OTHER PUBLICATIONS

Finnigan, Anne, "The Safe Way to Shop Online," Sep. 1998, p. 162, Good Housekeeping, v. 227 No. 3.

(Continued)

*Primary Examiner* — Kenneth R Coulter
(74) *Attorney, Agent, or Firm* — Haverstock & Owens LLP

(57) ABSTRACT

A method and apparatus which provides for remote and secure access to a host computer, and which further provides an open application standard for client access to the host computer.

10 Claims, 10 Drawing Sheets

U.S. PATENT DOCUMENTS

| | | | |
|---|---|---|---|
| 5,684,990 A | 11/1997 | Boothby | 395/619 |
| 5,694,596 A | 12/1997 | Campbell | 395/610 |
| 5,699,255 A | 12/1997 | Ellis et al. | 701/212 |
| 5,701,423 A | 12/1997 | Crozier | 395/335 |
| 5,706,509 A | 1/1998 | Man-Hak Tso | 395/617 |
| 5,710,922 A | 1/1998 | Alley et al. | 395/617 |
| 5,727,202 A | 3/1998 | Kucala | 395/610 |
| 5,727,950 A | 3/1998 | Cook et al. | 434/330 |
| 5,729,735 A | 3/1998 | Meyering | 395/610 |
| 5,729,739 A | 3/1998 | Cantin et al. | 395/614 |
| 5,729,743 A | 3/1998 | Squibb | 395/619 |
| 5,742,792 A | 4/1998 | Yanai et al. | 395/489 |
| 5,745,750 A | 4/1998 | Porcaro | 707/102 |
| 5,745,906 A | 4/1998 | Squibb | 707/203 |
| 5,757,920 A | 5/1998 | Misra et al. | 380/25 |
| 5,758,150 A | 5/1998 | Bell et al. | 395/610 |
| 5,758,355 A | 5/1998 | Buchanan | 707/201 |
| 5,764,899 A | 6/1998 | Eggleston et al. | 709/203 |
| 5,768,480 A | 6/1998 | Crawford, Jr. et al. | |
| 5,768,597 A | 6/1998 | Simm | 395/712 |
| 5,771,354 A | 6/1998 | Crawford | 395/200.59 |
| 5,778,346 A | 7/1998 | Frid-Nielsen et al. | 705/9 |
| 5,778,361 A | 7/1998 | Nanjo et al. | 707/500 |
| 5,778,367 A | 7/1998 | Wesinger et al. | 395/10 |
| 5,778,388 A | 7/1998 | Kawamura et al. | 707/203 |
| 5,781,901 A | 7/1998 | Kuzma | 707/101 |
| 5,787,247 A | 7/1998 | Norin et al. | 395/200.5 |
| 5,787,262 A | 7/1998 | Shakib et al. | 395/200.35 |
| 5,794,228 A | 8/1998 | French et al. | 707/2 |
| 5,804,803 A | 9/1998 | Cragun et al. | 235/375 |
| 5,809,497 A | 9/1998 | Freund et al. | 707/2 |
| 5,812,773 A | 9/1998 | Norin | 395/200.34 |
| 5,812,793 A | 9/1998 | Shakib et al. | 395/200.31 |
| 5,818,437 A | 10/1998 | Grover et al. | 345/811 |
| 5,826,245 A | 10/1998 | Sandberg-Diment | 705/44 |
| 5,832,489 A | 11/1998 | Kucala | 707/10 |
| 5,832,518 A | 11/1998 | Mastors | 707/202 |
| 5,832,519 A | 11/1998 | Bowen et al. | 707/203 |
| 5,832,520 A | 11/1998 | Miller | |
| 5,845,283 A | 12/1998 | Williams et al. | 707/101 |
| 5,859,973 A | 1/1999 | Carpenter | 395/200.33 |
| 5,864,864 A | 1/1999 | Lerner | 707/102 |
| 5,875,296 A | 2/1999 | Shi et al. | 395/188.01 |
| 5,884,323 A | 3/1999 | Hawkins et al. | 707/201 |
| 5,884,325 A | 3/1999 | Bauer et al. | 707/201 |
| 5,893,119 A | 4/1999 | Squibb | 707/203 |
| 5,896,321 A | 4/1999 | Miller | 365/189.01 |
| 5,897,640 A | 4/1999 | Veghte et al. | 707/202 |
| 5,897,642 A | 4/1999 | Capossela et al. | 707/203 |
| 5,903,723 A | 5/1999 | Beck et al. | 709/203 |
| 5,907,793 A | 5/1999 | Reams | 455/3.1 |
| 5,923,756 A | 7/1999 | Shambroom | 713/156 |
| 5,923,848 A | 7/1999 | Goodhand et al. | 395/200.49 |
| 5,926,816 A | 7/1999 | Bauer et al. | 707/8 |
| 5,933,653 A | 8/1999 | Ofek | 395/826 |
| 5,933,778 A | 8/1999 | Buhrmann et al. | |
| 5,933,816 A | 8/1999 | Zeanah et al. | 705/35 |
| 5,935,262 A | 8/1999 | Barrett et al. | 714/46 |
| 5,937,405 A | 8/1999 | Campbell | 707/10 |
| 5,941,944 A | 8/1999 | Messerly | 709/203 |
| 5,943,676 A | 8/1999 | Boothby | 707/201 |
| 5,944,787 A | 8/1999 | Zoken | 709/206 |
| 5,946,615 A | 8/1999 | Holmes et al. | 455/412 |
| 5,948,066 A | 9/1999 | Whalen et al. | 709/229 |
| 5,951,636 A | 9/1999 | Zerber | 709/202 |
| 5,961,572 A | 10/1999 | Craport et al. | 340/990 |
| 5,961,590 A | 10/1999 | Mendez et al. | 709/206 |
| 5,968,131 A | 10/1999 | Mendez et al. | 709/246 |
| 5,970,149 A | 10/1999 | Johnson | 714/46 |
| 5,970,490 A | 10/1999 | Morgenstern | 707/10 |
| 5,971,277 A | 10/1999 | Cragun et al. | 235/462.01 |
| 5,974,238 A | 10/1999 | Chase, Jr. | 395/200.78 |
| 5,974,563 A | 10/1999 | Beeler, Jr. | 714/5 |
| 5,987,381 A | 11/1999 | Oshizawa | 340/990 |
| 5,987,609 A | 11/1999 | Hasebe | 726/35 |
| 5,995,118 A | 11/1999 | Masuda | 345/467 |
| 6,000,000 A | 12/1999 | Hawkins et al. | 707/201 |
| 6,006,215 A | 12/1999 | Retallick | 707/2 |
| 6,006,274 A | 12/1999 | Hawkins et al. | 709/248 |
| 6,009,462 A | 12/1999 | Birrell et al. | 709/206 |
| 6,012,063 A | 1/2000 | Bodnar | 707/101 |
| 6,012,088 A | 1/2000 | Li et al. | |
| 6,014,695 A | 1/2000 | Yamashita et al. | 709/219 |
| 6,016,394 A | 1/2000 | Walker | 717/104 |
| 6,016,478 A | 1/2000 | Zhang et al. | 705/9 |
| 6,023,708 A | 2/2000 | Mendez et al. | 707/203 |
| 6,023,723 A | 2/2000 | McCormick et al. | 709/206 |
| 6,026,414 A | 2/2000 | Anglin | 707/204 |
| 6,034,621 A | 3/2000 | Kaufman | 340/825.44 |
| 6,038,665 A | 3/2000 | Bolt et al. | 713/176 |
| 6,044,381 A | 3/2000 | Boothby et al. | 707/201 |
| 6,049,776 A | 4/2000 | Donnelly et al. | 705/8 |
| 6,052,735 A | 4/2000 | Ulrich et al. | 709/236 |
| 6,058,399 A | 5/2000 | Morag et al. | 707/201 |
| 6,061,790 A | 5/2000 | Bodnar | 713/171 |
| 6,061,796 A | 5/2000 | Chen et al. | 713/201 |
| 6,063,134 A | 5/2000 | Peters et al. | |
| 6,064,880 A | 5/2000 | Alanara | 455/419 |
| 6,065,018 A | 5/2000 | Beier et al. | 707/202 |
| 6,073,133 A | 6/2000 | Chrabaszcz | 707/10 |
| 6,076,109 A | 6/2000 | Kikinis | |
| 6,078,960 A * | 6/2000 | Ballard | 709/229 |
| 6,081,900 A | 6/2000 | Subramaniam et al. | 713/201 |
| 6,094,618 A | 7/2000 | Harada | 701/207 |
| 6,101,480 A | 8/2000 | Conmy et al. | 705/9 |
| 6,108,330 A | 8/2000 | Bhatia et al. | 370/352 |
| 6,108,703 A | 8/2000 | Leighton et al. | 709/226 |
| 6,112,024 A | 8/2000 | Almond et al. | |
| 6,115,797 A | 9/2000 | Kanda et al. | |
| 6,131,096 A | 10/2000 | Ng et al. | 707/10 |
| 6,131,116 A | 10/2000 | Riggins et al. | 709/219 |
| 6,141,011 A | 10/2000 | Bodnar et al. | 345/357 |
| 6,141,621 A | 10/2000 | Piwowarski et al. | 340/989 |
| 6,141,659 A | 10/2000 | Barker et al. | 707/102 |
| 6,141,664 A | 10/2000 | Boothby | 707/201 |
| 6,145,088 A | 11/2000 | Stevens | |
| 6,148,260 A | 11/2000 | Musk et al. | 701/200 |
| 6,151,606 A | 11/2000 | Mendez | 707/201 |
| 6,157,630 A | 12/2000 | Adler et al. | 370/310 |
| 6,163,773 A | 12/2000 | Kishi | 706/16 |
| 6,163,779 A | 12/2000 | Mantha et al. | 707/100 |
| 6,163,844 A | 12/2000 | Duncan et al. | 713/201 |
| 6,167,120 A * | 12/2000 | Kikinis | 379/90.01 |
| 6,173,310 B1 | 1/2001 | Yost et al. | 709/201 |
| 6,173,311 B1 | 1/2001 | Hassett et al. | 709/202 |
| 6,182,117 B1 | 1/2001 | Christie et al. | 709/205 |
| 6,182,141 B1 | 1/2001 | Blum et al. | 709/227 |
| 6,185,598 B1 | 2/2001 | Farber et al. | 709/200 |
| 6,189,030 B1 | 2/2001 | Kirsch et al. | 709/224 |
| 6,189,096 B1 | 2/2001 | Haverty | 713/155 |
| 6,195,695 B1 | 2/2001 | Cheston et al. | 709/221 |
| 6,195,794 B1 | 2/2001 | Buxton | 717/11 |
| 6,202,085 B1 | 3/2001 | Benson et al. | 709/205 |
| 6,205,448 B1 | 3/2001 | Kruglikov et al. | 707/200 |
| 6,209,034 B1 | 3/2001 | Gladwin et al. | |
| 6,212,529 B1 | 4/2001 | Boothby et al. | 707/201 |
| 6,212,556 B1 | 4/2001 | Arunachalam | |
| 6,216,131 B1 | 4/2001 | Liu et al. | 707/102 |
| 6,219,680 B1 | 4/2001 | Bernardo et al. | 707/501 |
| 6,219,694 B1 | 4/2001 | Lazaridis et al. | 709/206 |
| 6,223,187 B1 | 4/2001 | Boothby et al. | 707/201 |
| 6,226,650 B1 | 5/2001 | Mahajan et al. | 707/201 |
| 6,233,565 B1 | 5/2001 | Lewis et al. | 705/35 |
| 6,233,589 B1 | 5/2001 | Balcha et al. | 707/203 |
| 6,243,760 B1 | 6/2001 | Armbruster et al. | 709/243 |
| 6,247,048 B1 | 6/2001 | Greer et al. | |
| 6,249,690 B1 | 6/2001 | Mashiko | |
| 6,252,547 B1 | 6/2001 | Perry et al. | 342/357.06 |
| 6,255,989 B1 | 7/2001 | Munson et al. | 342/357.06 |
| 6,256,750 B1 | 7/2001 | Takeda | 714/11 |
| 6,260,124 B1 | 7/2001 | Crockett et al. | 711/162 |
| 6,272,545 B1 | 8/2001 | Flanagin et al. | 709/228 |
| 6,275,831 B1 | 8/2001 | Bodnar et al. | 707/201 |
| 6,278,941 B1 | 8/2001 | Yokoyama | 701/209 |
| 6,282,435 B1 | 8/2001 | Wagner et al. | 455/566 |
| 6,282,698 B1 | 8/2001 | Baker et al. | 717/1 |
| 6,285,889 B1 | 9/2001 | Nykanen et al. | 455/557 |

| Patent | Kind | Date | Assignee | Class |
|---|---|---|---|---|
| 6,286,029 | B1 | 9/2001 | Delph | |
| 6,286,053 | B1 | 9/2001 | Van Peursem et al. | 709/999.999 |
| 6,286,085 | B1 | 9/2001 | Jouenne et al. | 711/162 |
| 6,289,212 | B1 | 9/2001 | Stein et al. | |
| 6,292,743 | B1 | 9/2001 | Pu et al. | 455/456 |
| 6,292,905 | B1 | 9/2001 | Wallach et al. | 714/4 |
| 6,295,502 | B1 | 9/2001 | Hancock et al. | 701/201 |
| 6,295,541 | B1 | 9/2001 | Bodnar et al. | 707/203 |
| 6,304,881 | B1 | 10/2001 | Halim et al. | 707/201 |
| 6,317,755 | B1 | 11/2001 | Rakers et al. | 707/204 |
| 6,321,236 | B1 | 11/2001 | Zollinger et al. | 707/201 |
| 6,324,467 | B1 | 11/2001 | Machii et al. | 701/200 |
| 6,324,526 | B1 | 11/2001 | D'Agostino | 705/44 |
| 6,324,544 | B1 | 11/2001 | Alam et al. | 707/201 |
| 6,327,533 | B1 | 12/2001 | Chou | 340/988 |
| 6,329,680 | B1 | 12/2001 | Yoshida et al. | 257/296 |
| 6,330,568 | B1 | 12/2001 | Boothby et al. | 707/201 |
| 6,332,158 | B1 | 12/2001 | Risley et al. | 709/219 |
| 6,333,973 | B1 | 12/2001 | Smith et al. | 379/88.12 |
| 6,338,096 | B1 | 1/2002 | Ukelson | 719/319 |
| 6,339,710 | B1 | 1/2002 | Suzuki | 455/458 |
| 6,341,316 | B1 | 1/2002 | Kloba et al. | 709/248 |
| 6,345,308 | B1 | 2/2002 | Abe | 709/248 |
| 6,349,336 | B1 | 2/2002 | Sit et al. | |
| 6,353,448 | B1 | 3/2002 | Scarborough et al. | 345/349 |
| 6,356,910 | B1 | 3/2002 | Zellweger | 707/100 |
| 6,356,961 | B1 | 3/2002 | Oprescu-Surcobe | |
| 6,360,252 | B1 | 3/2002 | Rudy et al. | 709/206 |
| 6,360,330 | B1 | 3/2002 | Mutalik et al. | 714/4 |
| 6,363,249 | B1 | 3/2002 | Nordeman et al. | 455/418 |
| 6,363,412 | B1 | 3/2002 | Niwa et al. | 709/203 |
| 6,374,250 | B2 | 4/2002 | Ajtai et al. | 707/101 |
| 6,381,700 | B1 | 4/2002 | Yoshida | 713/201 |
| 6,389,462 | B1 | 5/2002 | Cohen et al. | 709/203 |
| 6,396,482 | B1 | 5/2002 | Griffin et al. | 345/169 |
| 6,397,307 | B2 | 5/2002 | Ohran | 711/161 |
| 6,397,351 | B1 | 5/2002 | Miller et al. | 714/13 |
| 6,401,104 | B1 | 6/2002 | LaRue et al. | 707/203 |
| 6,405,218 | B1 | 6/2002 | Boothby | 707/201 |
| 6,418,309 | B1 | 7/2002 | Moon et al. | 455/418 |
| 6,434,627 | B1 | 8/2002 | Millet et al. | 709/245 |
| 6,437,818 | B1 | 8/2002 | Ludwig et al. | 348/14.09 |
| 6,449,622 | B1 | 9/2002 | LaRue et al. | 707/201 |
| 6,453,392 | B1 | 9/2002 | Flynn, Jr. | 711/151 |
| 6,457,062 | B1 | 9/2002 | Pivowar et al. | 709/248 |
| 6,460,036 | B1 | 10/2002 | Herz | 707/10 |
| 6,462,644 | B1 | 10/2002 | Howell et al. | |
| 6,463,464 | B1 | 10/2002 | Lazaridis et al. | 709/207 |
| 6,466,967 | B2 | 10/2002 | Landsman et al. | 709/203 |
| 6,473,621 | B1 | 10/2002 | Heie | 455/466 |
| 6,480,896 | B1 | 11/2002 | Brown et al. | 709/231 |
| 6,484,143 | B1 | 11/2002 | Swildens et al. | 705/1 |
| 6,487,560 | B1 | 11/2002 | LaRue et al. | 707/201 |
| 6,490,655 | B1 | 12/2002 | Kershaw | 711/151 |
| 6,496,944 | B1 | 12/2002 | Hsiao et al. | 714/15 |
| 6,499,108 | B1 | 12/2002 | Johnson | 713/201 |
| 6,505,216 | B1 | 1/2003 | Schutzman et al. | |
| 6,507,891 | B1 | 1/2003 | Challenger et al. | 711/122 |
| 6,516,314 | B1 | 2/2003 | Birkler et al. | |
| 6,516,327 | B1 | 2/2003 | Zondervan et al. | 707/200 |
| 6,519,452 | B1 | 2/2003 | Agostino et al. | |
| 6,523,063 | B1 | 2/2003 | Hanson | 709/206 |
| 6,523,079 | B2 | 2/2003 | Kikinis et al. | 710/303 |
| 6,532,588 | B1 | 3/2003 | Porter | |
| 6,535,743 | B1 | 3/2003 | Kennedy et al. | 455/456.1 |
| 6,539,494 | B1 | 3/2003 | Abramson et al. | 714/4 |
| 6,542,933 | B1 | 4/2003 | Durst, Jr. et al. | 709/229 |
| 6,546,425 | B1 * | 4/2003 | Hanson et al. | 709/227 |
| 6,549,933 | B1 | 4/2003 | Barrett et al. | 709/203 |
| 6,553,375 | B1 * | 4/2003 | Huang et al. | 707/10 |
| 6,553,410 | B2 | 4/2003 | Kikinis | 709/218 |
| 6,553,413 | B1 | 4/2003 | Leighton et al. | 709/219 |
| 6,567,850 | B1 | 5/2003 | Freishtat et al. | 709/224 |
| 6,567,857 | B1 | 5/2003 | Gupta et al. | |
| 6,581,065 | B1 | 6/2003 | Rodkin et al. | 707/102 |
| 6,584,454 | B1 | 6/2003 | Hummel et al. | 705/59 |
| 6,589,290 | B1 | 7/2003 | Maxwell et al. | 707/507 |
| 6,591,266 | B1 | 7/2003 | Li et al. | 707/10 |
| 6,591,306 | B1 | 7/2003 | Redlich | 709/245 |
| 6,591,362 | B1 | 7/2003 | Li | 713/1 |
| 6,597,700 | B2 | 7/2003 | Golikeri et al. | 370/401 |
| 6,601,143 | B1 | 7/2003 | Lamparter | |
| 6,609,005 | B1 | 8/2003 | Chern | 455/457 |
| 6,628,194 | B1 | 9/2003 | Hellebust et al. | |
| 6,636,894 | B1 | 10/2003 | Short et al. | 709/225 |
| 6,640,302 | B1 | 10/2003 | Subramaniam et al. | 713/169 |
| 6,643,707 | B1 | 11/2003 | Booth | 709/245 |
| 6,647,399 | B2 | 11/2003 | Zaremba | |
| 6,654,746 | B1 | 11/2003 | Wong et al. | 707/10 |
| 6,662,212 | B1 | 12/2003 | Chandhok et al. | |
| 6,665,721 | B1 | 12/2003 | Hind et al. | |
| 6,671,724 | B1 | 12/2003 | Pandya et al. | 709/226 |
| 6,671,757 | B1 | 12/2003 | Multer et al. | 710/100 |
| 6,684,206 | B2 | 1/2004 | Chen et al. | 706/61 |
| 6,684,302 | B2 | 1/2004 | Kershaw | 711/151 |
| 6,694,335 | B1 | 2/2004 | Hopmann et al. | 707/200 |
| 6,694,336 | B1 | 2/2004 | Multer et al. | 707/100 |
| 6,701,316 | B1 | 3/2004 | Li et al. | 707/10 |
| 6,704,849 | B2 | 3/2004 | Steegmans | 711/162 |
| 6,714,987 | B1 | 3/2004 | Amin et al. | 709/249 |
| 6,718,348 | B1 | 4/2004 | Novak et al. | 707/201 |
| 6,718,390 | B1 | 4/2004 | Still et al. | 709/229 |
| 6,725,239 | B2 | 4/2004 | Sherman et al. | 707/201 |
| 6,728,530 | B1 | 4/2004 | Heinonen et al. | 455/414.1 |
| 6,732,101 | B1 | 5/2004 | Cook | 707/10 |
| 6,732,264 | B1 | 5/2004 | Sun et al. | 713/2 |
| 6,738,789 | B2 | 5/2004 | Multer et al. | 707/201 |
| 6,741,851 | B1 | 5/2004 | Lee et al. | |
| 6,745,040 | B2 | 6/2004 | Zimmerman | 455/458 |
| 6,757,696 | B2 | 6/2004 | Multer et al. | 707/201 |
| 6,757,698 | B2 | 6/2004 | McBride et al. | 707/204 |
| 6,757,712 | B1 * | 6/2004 | Bastian et al. | 709/206 |
| 6,781,575 | B1 | 8/2004 | Hawkins et al. | 345/173 |
| 6,795,848 | B1 | 9/2004 | Border et al. | 709/213 |
| 6,799,214 | B1 | 9/2004 | Li | 709/226 |
| 6,804,690 | B1 | 10/2004 | Dysert et al. | 707/204 |
| 6,804,783 | B1 | 10/2004 | Wesinger, Jr. et al. | 713/200 |
| 6,810,411 | B1 | 10/2004 | Coughlin et al. | |
| 6,812,961 | B1 | 11/2004 | Parulski et al. | 348/231.2 |
| 6,813,487 | B1 | 11/2004 | Trommelen | |
| 6,816,481 | B1 | 11/2004 | Adams et al. | 370/352 |
| 6,829,654 | B1 | 12/2004 | Jungck | |
| 6,836,657 | B2 | 12/2004 | Ji et al. | |
| 6,836,765 | B1 | 12/2004 | Sussman | 705/41 |
| 6,839,022 | B1 | 1/2005 | Benco et al. | |
| 6,839,568 | B2 | 1/2005 | Suzuki | 455/550.1 |
| 6,842,695 | B1 | 1/2005 | Tu et al. | 701/213 |
| 6,850,944 | B1 | 2/2005 | MacCall et al. | 707/100 |
| 6,868,451 | B1 | 3/2005 | Peacock | 709/231 |
| 6,870,921 | B1 | 3/2005 | Elsey et al. | 379/218.01 |
| 6,886,013 | B1 | 4/2005 | Beranek | 707/10 |
| 6,892,225 | B1 | 5/2005 | Tu et al. | 709/217 |
| 6,892,245 | B1 | 5/2005 | Crump et al. | 709/245 |
| 6,904,449 | B1 | 6/2005 | Quinones | |
| 6,904,460 | B1 | 6/2005 | Raciborski et al. | 709/224 |
| 6,920,488 | B1 | 7/2005 | Le Pennec et al. | 709/219 |
| 6,925,476 | B1 | 8/2005 | Multer | 707/200 |
| 6,925,477 | B1 | 8/2005 | Champagne et al. | 707/203 |
| 6,934,767 | B1 | 8/2005 | Jellinek | 709/247 |
| 6,944,651 | B2 | 9/2005 | Onyon et al. | 709/217 |
| 6,944,676 | B1 | 9/2005 | Armbruster et al. | 709/243 |
| 6,954,660 | B2 | 10/2005 | Aoyama | |
| 6,954,783 | B1 | 10/2005 | Bodwell et al. | 709/218 |
| 6,959,331 | B1 | 10/2005 | Traversat et al. | |
| 6,963,914 | B1 | 11/2005 | Breitbart et al. | 709/226 |
| 6,973,299 | B2 | 12/2005 | Apfel | |
| 6,996,617 | B1 | 2/2006 | Aiken, Jr. et al. | |
| 6,996,631 | B1 | 2/2006 | Aiken, Jr. et al. | 709/242 |
| 7,003,555 | B1 | 2/2006 | Jungck | 709/219 |
| 7,003,668 | B2 | 2/2006 | Berson et al. | 713/182 |
| 7,007,041 | B2 | 2/2006 | Multer et al. | 707/201 |
| 7,010,578 | B1 | 3/2006 | Lewin et al. | |
| 7,016,964 | B1 | 3/2006 | Still et al. | |
| 7,023,868 | B2 | 4/2006 | Rabenko et al. | 370/419 |
| 7,030,730 | B1 | 4/2006 | Zondervan | |
| 7,035,878 | B1 | 4/2006 | Multer et al. | 707/201 |
| 7,039,656 | B1 | 5/2006 | Tsai et al. | 707/201 |
| 7,051,275 | B2 | 5/2006 | Gupta et al. | 715/512 |

| | | | |
|---|---|---|---|
| 7,054,594 B2 | 5/2006 | Bloch et al. ................. 455/41.2 | |
| 7,054,952 B1 | 5/2006 | Schwerdtfeger et al. | |
| 7,082,476 B1 | 7/2006 | Cohen et al. | |
| 7,085,817 B1 | 8/2006 | Tock et al. | |
| 7,096,418 B1 | 8/2006 | Singhal et al. | |
| 7,099,915 B1 | 8/2006 | Tenereillo et al. | |
| 7,103,794 B2 | 9/2006 | Malcolm et al. | |
| 7,107,043 B2 | 9/2006 | Aoyama | |
| 7,110,954 B2 | 9/2006 | Yung et al. | |
| 7,116,681 B1 | 10/2006 | Hovell et al. ............... 370/466 | |
| 7,146,161 B2 | 12/2006 | Chou | |
| 7,158,805 B1 | 1/2007 | Park et al. | |
| 7,162,494 B2 | 1/2007 | Arellano ................... 707/104.1 | |
| 7,167,728 B1 | 1/2007 | Wagner et al. ............... 455/566 | |
| 7,181,628 B2 | 2/2007 | Sato et al. | |
| 7,197,574 B1 | 3/2007 | Ishiyama ..................... 709/245 | |
| 7,233,791 B2 | 6/2007 | Gilbert et al. ............... 455/419 | |
| 7,237,027 B1 | 6/2007 | Raccah et al. | |
| 7,249,175 B1 | 7/2007 | Donaldson ................... 709/225 | |
| 7,269,433 B2 | 9/2007 | Vargas et al. ............... 455/502 | |
| 7,284,051 B1 | 10/2007 | Okano et al. ................. 709/226 | |
| 7,289,964 B1 | 10/2007 | Bowman-Amuah ............ 705/1 | |
| 7,293,074 B1 | 11/2007 | Jellinek et al. ............... 709/205 | |
| 7,315,826 B1 | 1/2008 | Guheen et al. ................... 705/7 | |
| 7,317,907 B2 | 1/2008 | Linkert et al. | |
| 7,343,568 B2 | 3/2008 | Jiang et al. | |
| 7,349,719 B2 | 3/2008 | Buniatyan | |
| 7,356,559 B1 | 4/2008 | Jacobs et al. ................. 709/203 | |
| 7,363,233 B1 | 4/2008 | Levine ............................. 705/1 | |
| 7,383,061 B1 | 6/2008 | Hawkins | |
| 7,392,034 B2 | 6/2008 | Westman et al. ............. 455/402 | |
| 7,415,486 B2 | 8/2008 | Multer et al. ................. 709/201 | |
| 7,440,746 B1 | 10/2008 | Swan | |
| 7,447,743 B1 | 11/2008 | Jordan, Jr. ..................... 709/206 | |
| 7,454,500 B1 | 11/2008 | Hsu et al. ..................... 709/226 | |
| 7,499,888 B1 | 3/2009 | Tu et al. ........................ 705/44 | |
| 7,505,762 B2 | 3/2009 | Onyon et al. ................. 455/419 | |
| 7,519,702 B1 | 4/2009 | Allan | |
| 7,596,609 B1 | 9/2009 | Refuah et al. | |
| 7,663,652 B1 | 2/2010 | Reese | |
| 7,853,664 B1 | 12/2010 | Wang et al. | |
| 7,895,334 B1 * | 2/2011 | Tu et al. ......................... 709/227 | |
| 2001/0014893 A1 | 8/2001 | Boothby ........................ 707/201 | |
| 2001/0028363 A1 | 10/2001 | Nomoto et al. | |
| 2001/0034737 A1 | 10/2001 | Cane et al. | |
| 2001/0044805 A1 | 11/2001 | Multer et al. ................. 707/201 | |
| 2001/0047471 A1 | 11/2001 | Johnson ............................ 713/1 | |
| 2001/0051920 A1 | 12/2001 | Joao et al. ........................ 705/41 | |
| 2001/0056473 A1 | 12/2001 | Arneson et al. | |
| 2002/0007303 A1 | 1/2002 | Brokler et al. ................. 705/10 | |
| 2002/0010868 A1 | 1/2002 | Nakashima et al. ........... 713/201 | |
| 2002/0016818 A1 | 2/2002 | Kirani et al. ................... 709/206 | |
| 2002/0016912 A1 | 2/2002 | Johnson ........................ 713/165 | |
| 2002/0032751 A1 | 3/2002 | Bharadwaj ..................... 709/218 | |
| 2002/0040369 A1 | 4/2002 | Multer et al. ................. 707/200 | |
| 2002/0049852 A1 | 4/2002 | Lee et al. ....................... 709/231 | |
| 2002/0055909 A1 | 5/2002 | Fung et al. ...................... 705/42 | |
| 2002/0056011 A1 | 5/2002 | Nardone et al. ............... 709/248 | |
| 2002/0059116 A1 | 5/2002 | Bulatovic et al. ............... 705/27 | |
| 2002/0062365 A1 * | 5/2002 | Nishikawa et al. ............ 709/223 | |
| 2002/0067816 A1 | 6/2002 | Bushnell | |
| 2002/0069178 A1 | 6/2002 | Hoffman | |
| 2002/0073212 A1 | 6/2002 | Sokol et al. ................... 709/229 | |
| 2002/0078075 A1 | 6/2002 | Colson et al. ................. 707/204 | |
| 2002/0082995 A1 | 6/2002 | Christie ........................ 705/44 | |
| 2002/0083325 A1 | 6/2002 | Mediratta et al. ............. 713/191 | |
| 2002/0091785 A1 | 7/2002 | Ohlenbusch et al. ........... 709/208 | |
| 2002/0116444 A1 | 8/2002 | Chaudhri et al. ............. 709/201 | |
| 2002/0120600 A1 | 8/2002 | Schiavone et al. ................. 707/1 | |
| 2002/0128908 A1 | 9/2002 | Levin et al. ..................... 705/14 | |
| 2002/0138582 A1 | 9/2002 | Chandra et al. ............... 709/206 | |
| 2002/0152278 A1 | 10/2002 | Pontenzone et al. | |
| 2002/0162011 A1 | 10/2002 | Tanaka et al. ................ 713/200 | |
| 2002/0168964 A1 | 11/2002 | Kraft | |
| 2003/0021274 A1 | 1/2003 | Siikaniemi et al. | |
| 2003/0028451 A1 | 2/2003 | Ananian ......................... 705/27 | |
| 2003/0069874 A1 | 4/2003 | Hertzog et al. .................. 707/1 | |
| 2003/0204568 A1 | 10/2003 | Bhargava et al. ............. 709/206 | |
| 2003/0229898 A1 | 12/2003 | Babu et al. ..................... 725/87 | |
| 2004/0054746 A1 | 3/2004 | Shibata ......................... 709/207 |
| 2004/0093385 A1 | 5/2004 | Yamagata ..................... 709/206 |
| 2004/0111465 A1 | 6/2004 | Chuang et al. ................ 709/203 |
| 2004/0120477 A1 | 6/2004 | Nguyen et al. |
| 2004/0148408 A1 | 7/2004 | Nadarajah |
| 2004/0192260 A1 | 9/2004 | Sugimoto et al. ............ 455/412.1 |
| 2004/0192282 A1 | 9/2004 | Vasudevan .................. 455/412.1 |
| 2004/0204120 A1 | 10/2004 | Jiles |
| 2004/0224665 A1 | 11/2004 | Kokubo ........................ 455/411 |
| 2004/0267390 A1 | 12/2004 | Ben-Yaacov et al. |
| 2005/0086296 A1 | 4/2005 | Chi et al. ....................... 709/203 |
| 2005/0090253 A1 | 4/2005 | Kim et al. .................... 455/435.1 |
| 2005/0096975 A1 | 5/2005 | Moshe |
| 2005/0131990 A1 | 6/2005 | Jewell ........................... 709/201 |
| 2005/0144200 A1 | 6/2005 | Hesselink et al. |
| 2005/0227674 A1 | 10/2005 | Kopra et al. |
| 2005/0240494 A1 | 10/2005 | Cue et al. |
| 2005/0273632 A1 | 12/2005 | Kawakami |
| 2006/0095397 A1 | 5/2006 | Torres et al. |
| 2006/0190626 A1 | 8/2006 | Bhogal et al. ................. 709/248 |
| 2006/0212482 A1 | 9/2006 | Celik |
| 2007/0050734 A1 | 3/2007 | Busey ........................... 715/853 |
| 2007/0061331 A1 | 3/2007 | Ramer et al. .................... 707/10 |
| 2007/0094042 A1 | 4/2007 | Ramer et al. ...................... 705/1 |
| 2007/0220419 A1 | 9/2007 | Stibel et al. |
| 2008/0009268 A1 | 1/2008 | Ramer et al. |
| 2008/0022220 A1 | 1/2008 | Cheah ............................ 715/769 |
| 2008/0039020 A1 | 2/2008 | Eskin ............................ 455/41.2 |
| 2009/0037828 A1 | 2/2009 | Waite et al. |
| 2009/0138546 A1 | 5/2009 | Cruzada |

FOREIGN PATENT DOCUMENTS

| | | |
|---|---|---|
| CN | 1455522 | 11/2003 |
| CN | 1313697 A | 2/2005 |
| CN | 2003-122958 | 7/2006 |
| EP | 0801487 A2 | 10/1997 |
| EP | 0836131 A2 | 4/1998 |
| EP | 0836301 A | 4/1998 |
| EP | 0924917 A2 | 6/1999 |
| EP | 0930593 A | 7/1999 |
| EP | 1024441 A2 | 2/2000 |
| EP | 0986225 A1 | 3/2000 |
| EP | 1139608 A2 | 10/2001 |
| EP | 1180890 A2 | 2/2002 |
| EP | 1263244 A2 | 4/2002 |
| FR | 1998-106683 | 4/1998 |
| GB | 2366050 A | 6/2001 |
| JP | 7303146 A | 11/1995 |
| JP | 10191453 | 7/1998 |
| JP | 11242620 | 9/1999 |
| JP | 11242677 | 9/1999 |
| JP | 2000232680 A | 8/2000 |
| JP | 2000316053 A | 11/2000 |
| JP | 2002142254 A | 5/2002 |
| JP | 2002185575 A | 6/2002 |
| JP | 2002247144 A | 8/2002 |
| JP | 2002314689 A | 10/2002 |
| JP | 2003259011 A | 9/2003 |
| WO | WO 97/04391 | 2/1997 |
| WO | WO 97/39564 | 10/1997 |
| WO | WO 97/41520 | 11/1997 |
| WO | WO 98/03005 | 1/1998 |
| WO | WO 98/21648 | 5/1998 |
| WO | WO 98/29994 A | 7/1998 |
| WO | WO 98/54662 | 12/1998 |
| WO | WO 98/56159 A | 12/1998 |
| WO | WO 99/05813 | 2/1999 |
| WO | WO 99/06900 | 2/1999 |
| WO | WO 99/36870 | 7/1999 |
| WO | WO 99/40514 | 8/1999 |
| WO | WO 99/45451 | 9/1999 |
| WO | WO 99/45484 | 9/1999 |
| WO | WO 99/46701 A | 9/1999 |
| WO | WO 99/50761 | 10/1999 |
| WO | WO 99/65256 | 12/1999 |
| WO | WO 00/11832 | 3/2000 |
| WO | WO 00/16222 | 3/2000 |
| WO | WO 00/29998 | 5/2000 |
| WO | 0133874 A1 | 5/2001 |

| | | |
|---|---|---|
| WO | WO 01/71539 | 9/2001 |
| WO | WO 01/80535 A1 | 9/2001 |
| WO | 0217140 A2 | 2/2002 |
| WO | 03-083716 A1 | 10/2003 |
| WO | WO 2005/112586 A2 | 12/2005 |

OTHER PUBLICATIONS

Chase, Larry, "Taking Transactions Online," Oct. 1998, pp. 124-132, Target Marketing, v.21 No. 10.

Gong, Li, "Increasing Availability and Security of an Authentication Service," Jun. 1993, pp. 657-662, IEEE Journal on Selected Areas in Communications, v. 11 No. 5.

DeMaio, Harry B., "My MIPS Are Sealed," Sep./Oct. 1993, pp. 46-51, Chief Information Officer Journal, v. 5 issue 7.

Rou et al., "Online File Storage System," 2002 Student Conference on Research and Development Proceedings, Shah Alam, Malaysia, Nov. 7, 2002, IEEE, pp. 83-86.

Agarwal et al. "On the Scalability of Data Synchronization Protocols for PDAs and Mobile Devices," Jul. 2002, IEEE Network, pp. 22-28.

Internet Mail Consortium: :vCard Overview, Oct. 13, 1998, 3 pages, Retrieved from the Internet: www.imc.org/pdi/vcardoverview.

Internet Mail Consortium: :vCard The Electronic Business Card, Jan. 1, 1997, 5 pages, Retrieved from the Internet: www.imc.org/pdi/vcardwhite.html.

Reed, Benjamin C., et al., "Authenticating Network-Attached Storage," IEEE, Jan.-Feb. 2000, pp. 49-57.

Gaskin J.E. :Messaging-Instant Enterprise—Once a Novelty Item, IM is Becoming a More Serious Tool for Business Users, InternetWeek, No. 810, Apr. 24, 2000, p. 55.

BusinessWire, "FusionOne Partners with WhitePages.com to Deliver Automatic Synchronization for Online Subscriber," press release, Oct. 11, 2000.

Malone, et al., "Semi-Structured Messages are Surprisingly Useful for Computer-Supported Coordination", Proceedings of the Conference on Computer-Supported Cooperative Work, Austin, Texas, Dec. 3-5, 1986, pp. 1-26.

Patel et al., "The Multimedia Fax-MIME Gateway," 8440 IEEE MultiMedia No. 4, Jan. 1994, 7 pgs.

Lamb et al., "LAN-Based Office for the Enterprise, A Case Study," Advantis Company, White Plains, NY 10605, Jan. 1994 IEEE, pp. 440-447.

\* cited by examiner

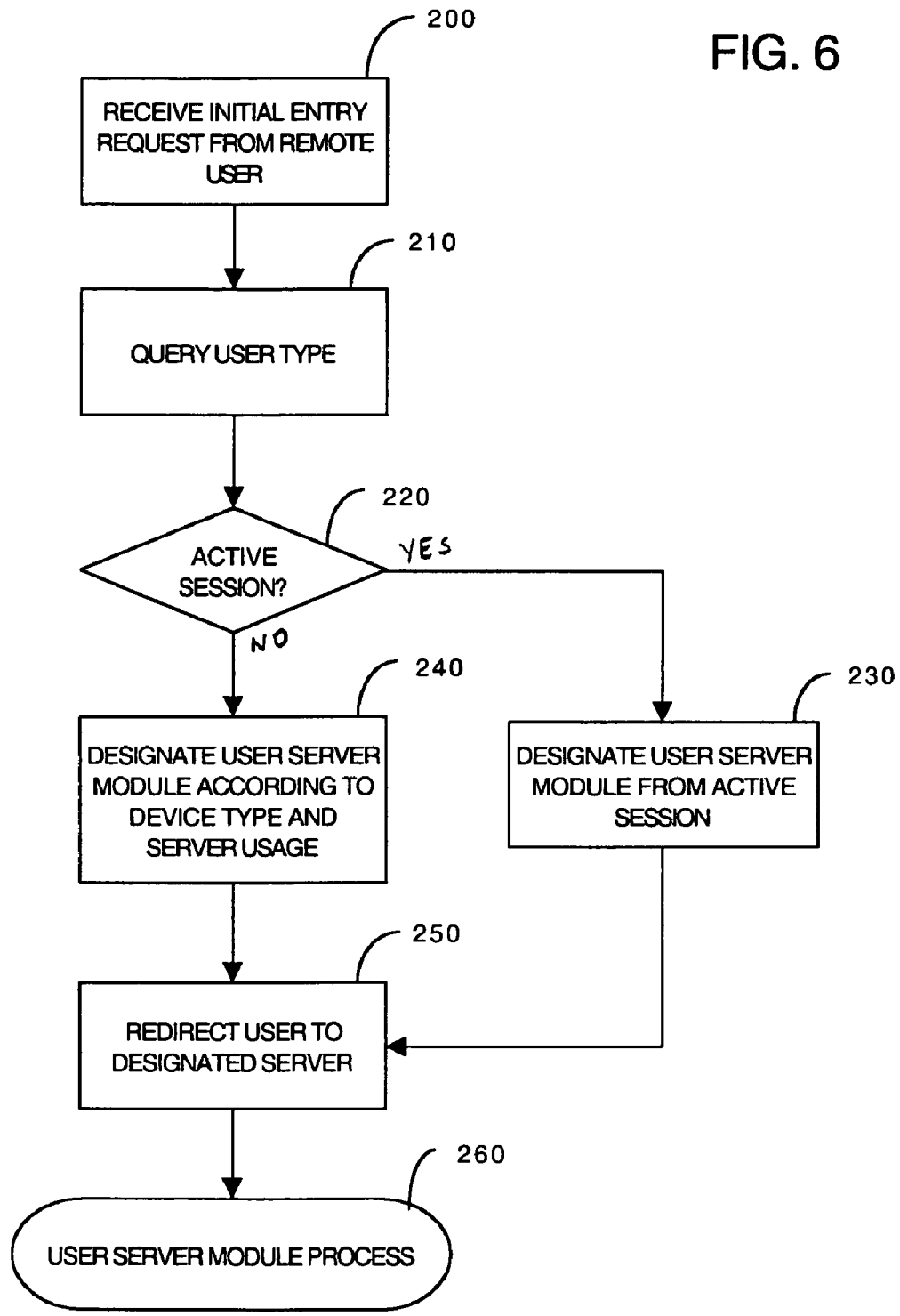

METHOD AND APPARATUS FOR A SECURE REMOTE ACCESS SYSTEM

BACKGROUND OF THE INVENTION

1. Field of the Invention

This invention pertains generally to remote access systems. More particularly, the invention is a method and apparatus which provides for remote and secure access to a host computer, and which further provides an open application standard for client access to the host computer.

2. The Prior Art

In general, remote access systems allow a "remote" user (from a remote computer) to connect to and access resources on another computer. For example, a user on a mobile computer may connect to and access resources on a home computer via conventional remote access systems. However, prior art remote access systems require special application software to be supplied to both the remote system and the base system. Due to this shortcoming, most prior art remote access systems are limited to devices including substantial computing capabilities in the remote computer. Also, access to another computer via a remote access system is provided using conventional data connection means, typically through a PSTN (public switched telephone network) connection. That is, a direct connection from the remote computer to the base computer is typically required for security reasons.

Remote access systems can generally be categorized into two types of systems. The first system is generally referred to as a remote access server (RAS) system. A RAS system usually comprises server RAS software residing on a RAS server and client RAS software residing on a "remote" computer. The RAS server is coupled to resources (e.g., printers, files, other nodes) which are remotely accessed by a user of the system. In operation, a user of the remote computer connects to the RAS server via a dial-in telephone connection. Upon connection, the RAS server queries for the user's access credentials (e.g., user name and password). Upon authentication of the user's access credentials, the user is granted access to resources on the RAS server and/or resources on other nodes connected to the RAS server to which the user is authorized access. The RAS software manages the connection process, the authentication process, the access privileges, and the data transfers between the RAS server and the remote computer. RAS systems are also used by commercial service providers, such as Internet Access Providers (ISPs) to allow their customers access into their network resources.

In another implementation, RAS systems may be used in conjunction with an Internet connection. In this scheme, a user is able to access a RAS server indirectly via the Internet, rather than directly via a point to point telephone connection. These RAS systems are generally referred to as virtual private networks (VPNs), because a secure channel is provided via the normally unsecured Internet. In VPNs, a remote user having a computer operatively coupled to the VPN, is able to access resources on another computer via the Internet using Internet protocols.

The other type of remote access system is generally referred to as a remote control system (RCS). RCSs allow a remote user to not only access resources on another "host" computer, but also allow the user to control the host computer. RCSs typically display on the remote computer what would normally be displayed on the host computer (known as screen emulation). In this way, the user is able to control the host computer from the remote computer as if the user was directly accessing the host computer. An example of a commercially available RCS product is PC Anywhere™ by Symantec Corp™. Like RAS systems, RCS allows a remote user to connect via a conventional means, including a telephone connection and via the Internet. Again, special software is required on both nodes.

There are several disadvantages with RAS and RCS systems. In RAS systems, file synchronization poses a common problem, particularly with respect to email applications. For example, where a remote user downloads email to the remote computer it may be stored on the remote computer. Thus, when the user gets back to the local computer, that email is not accessible on the remote computer, but must somehow be transferred from the remote computer or disregarded. This can become quite frustrating to the user.

In addition, in RAS implementations certain files may be unusable without the original application. For example, with certain email applications, the messages associated with the email application are commonly stored in a proprietary file format. Without the original email application, the file would be unusable to the remote user if the original application is not installed on the remote computer accessed by the user.

RCS, on the other hand, typically requires proprietary software to be installed on both the server (host) and client (remote) computers. Proprietary software limits the ability of a remote user to access the host computer, because such proprietary software may not be readily accessible.

In addition, often the setup and administration of RAS and RCS systems are cumbersome or otherwise overwhelming for the home or corporate users. Setup normally involves the assistance of a network system administrator and is usually complicated further by the fact that each user may have different remote computers and different host computers. Each setup then becomes unique and difficult.

Accordingly, there is a need for a method and apparatus which provides for remote and secure access to a host computer, and which further provides an open application standard for client access to the host computer. The present invention satisfies these needs, as well as others, and generally overcomes the deficiencies found in the background art.

BRIEF DESCRIPTION OF THE INVENTION

The present invention is a secure remote access system and method for providing access to a host computer or base appliance. The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

The remote access system comprises a web server services module and one or more "user" server services modules. The web server services module and the user server services module of the present invention may be executed on a single data processing means or computer, but are preferably executed on a plurality of computers and according to the load balancing algorithm of the present invention as described more fully below.

The web server services module executes on a server device (web server) and is operatively coupled to a remote access device accessed by a user of the system. The remote access device may be any data processing means configured to execute web browsing software. When the user establishes a connection from the remote access device to the web server, the web server determines what type of device the user is accessing. The present invention supports a plurality of remote access devices including, for example, a computer, a mobile telephone, a personal digital assistant (PDA), or other Internet appliance device, such as a set-top web terminal (e.g., WebTV™).

A load balancing module operates in conjunction with the web server to determine to which user server module the user is redirected. The load balancing algorithm is described more fully below. In general, user servers are delegated on a "user" basis rather than on a request basis. The user of the remote access device is then redirected to a user server module according to the type of remote access device and according to the load balancing module. Further transactions between the user and the remote access system are carried out by the delegated user server module.

Each user server services module operates on a conventional computer. In order to provide robust performance, a plurality of servers (server farm) are provided for each user type, although as noted before, the invention may be carried out on a single computer. For example, a "computer" server farm is defined for computer users, a "mobile phone" server farm is defined for mobile phone users, a "PDA" server farm is defined for PDA users, and an "Internet appliance" server farm is defined for Internet appliance users. Other server farms may be further defined for other device users. As noted above, the user of the remote access device is redirected to one of the user servers according to the type of the remote access device and according to the load balancing scheme.

The user server modules are further coupled to one or more base devices. Each base device is identified with a particular user of the system. Thus for each user accessing the system via the remote access device, a corresponding base device is identified with the user. For example, a user may be using a cellular phone (the remote access device) via the remote access system to access address book entries on the user's home computer (the base device).

The invention provides means to securely communicate data between the base machine and the user of the remote access device. In general, the communication between the user server module and the remote access device is a secure channel connection using hypertext transfer protocol. In this way, a conventional browser on the remote access device is suitable for use with the present invention without requiring proprietary software.

The invention provides a second secure channel between the user server module and the base device using a private protocol. To provide additional security, the invention provides that data communications between the user server module and the base device be initiated by the base device, rather than the server module. The details for carrying out communication transactions with the base device is described more fully below. In general, the base device initiates a request to the user server module which opens a communication socket between the base device and the user server module. In particular, the communication socket permits the base device and the user server module to communicate through a firewall. Once this communication socket is open, the server module is able to issue commands to the base device. In response, the base device then executes the command.

Co-pending U.S. patent application Ser. No. 09/618,956, now U.S. Pat. No. 7,895,334 entitled REMOTE ACCESS COMMUNICATION ARCHITECTURE APPARATUS AND METHOD, filed Jul. 19, 2000, which is expressly incorporated herein by reference, describes a system architecture and method suitable for use with the present invention.

It is understood that the following detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

FIG. 6 is a flow chart showing generally the acts associated with redirecting a remote access user to a user server module in accordance with the present invention.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Referring more specifically to the drawings, for illustrative purposes the present invention is embodied in the apparatus shown FIG. 1 through FIG. 4 and the method outlined in FIG. 5 through FIG. 9. It will be appreciated that the apparatus may vary as to configuration and as to details of the parts, and that the method may vary as to details and the order of the steps, without departing from the basic concepts as disclosed herein. The invention is disclosed generally in terms of a remote access system and method, although numerous other uses for the invention will suggest themselves to persons of ordinary skill in the art.

Figure 1:
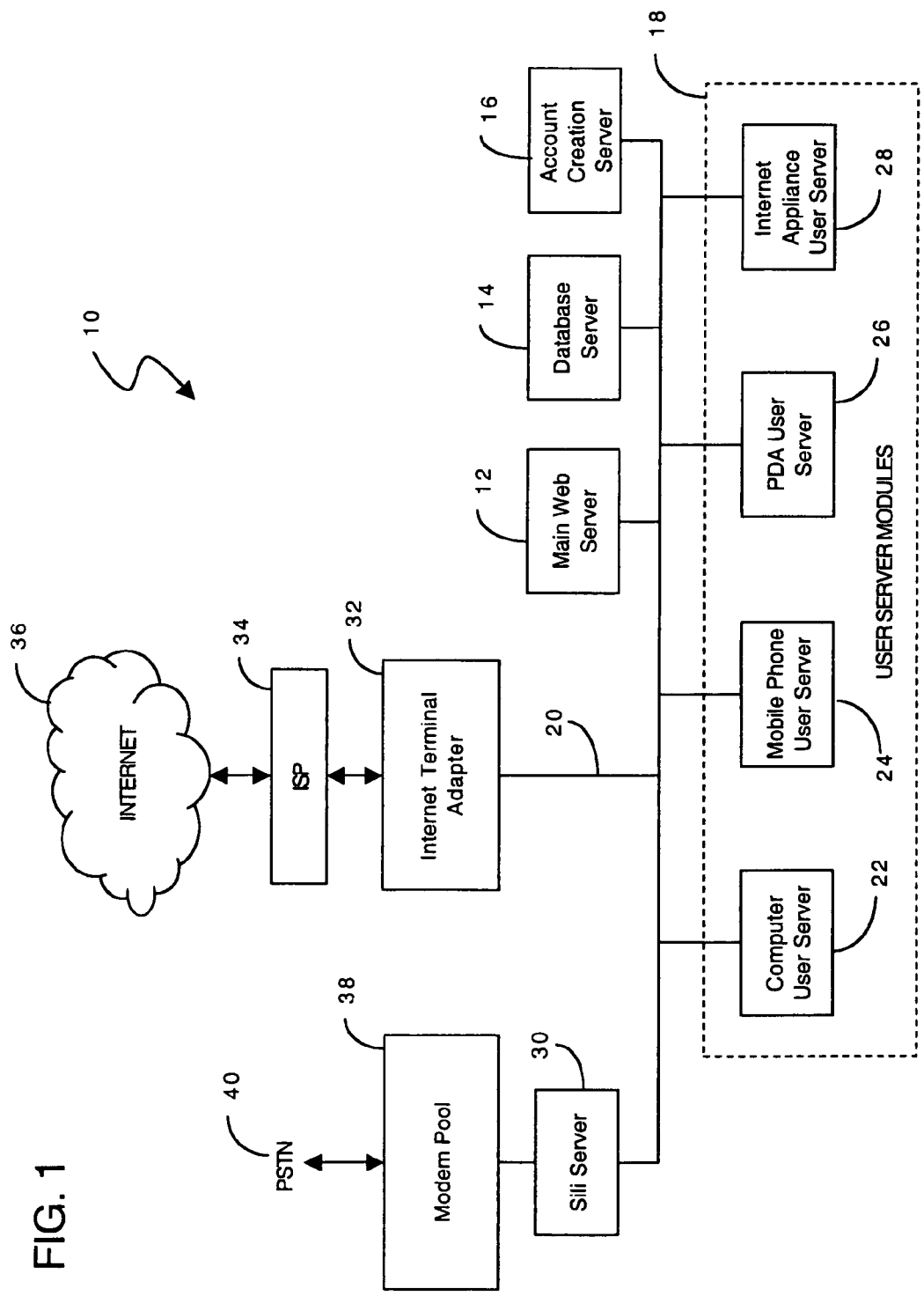
FIG. 1 is a functional block diagram showing a remote access system in accordance with the present invention.

Referring first to FIG. 1, there is shown a block diagram of a remote access system 10 suitable for use with the present invention. The system 10 comprises a main web server 12, a database server 14, an account creation server 16, and a plurality of user server modules (generally designated 18) each coupled to the other devices 12, 14, 16 via a network connection 20.

The user server modules 18 comprises a plurality of "user" servers, each identified with a remote user type. In the example system 10 depicted in FIG. 1, a computer user server 22 is provided for conventional computer users, a mobile phone user server 24 is provided for mobile phone users, a PDA user server 26 is provided for personal digital assistant (PDA) users, and an Internet appliance user server 28 is provided for other conventional Internet appliance users. Other "user" server modules may be further implemented to provide access to a particular remote user type as the need arises.

A Sili server 30 is further provided in system 10 and is coupled to the network 20 for communication to the user server modules 18. Server 12, 14, 16, 22, 24, 26, 28, 30 may be any standard data processing means, including a minicomputer, a microcomputer, a UNIX® machine, a mainframe, a personal computer (PC) such as an INTEL® based processing computer or clone thereof, an Apple® computer or clone thereof, or a SUN® workstation or server, or other appropriate computer. As such, servers 12, 14, 16, 22, 24, 26, 28, 30 generally include conventional hardware components (not shown) such as a motherboard, central processing unit (CPU), random access memory (RAM), hard disk drive, display adapter, other storage media, a monitor, keyboard, mouse, and other user interface means, a network interface card (NIC), and/or other conventional input/output devices.

Each server 12, 14, 16, 22, 24, 26, 28, 30 has loaded in its RAM conventional operating system software (not shown) such as UNIX®, Linux™, Windows NT®, Novell®, Solaris® or other server operating system. Main Web Server 12 further has loaded in its RAM the web server software (not shown) for handling http (hyper text transfer protocol) or web page requests from remote users. Web Server 12 is described more fully below in conjunction with FIG. 3 and FIG. 6.

Figure 7A:
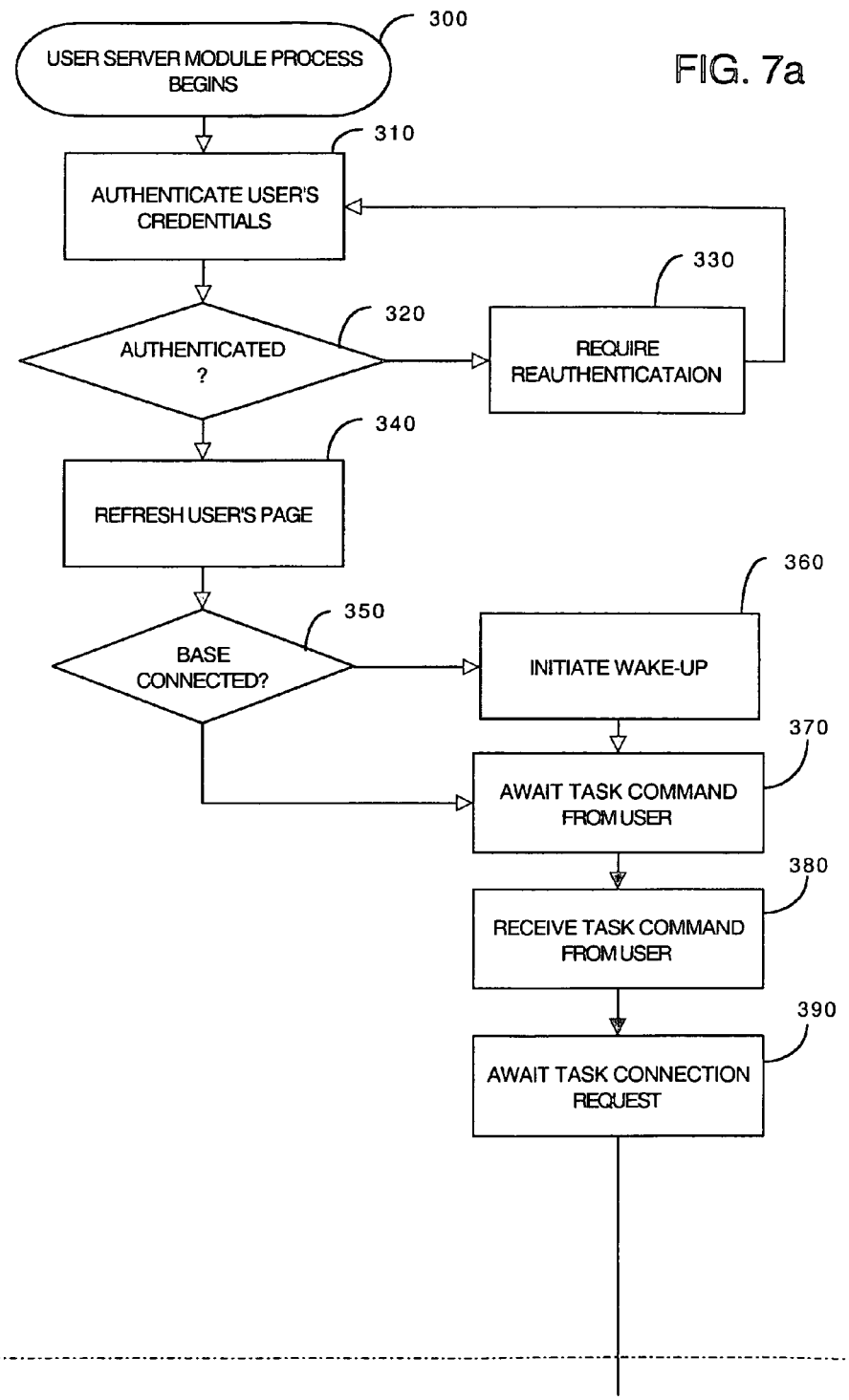
FIG. 7 (FIG. 7A and FIG. 7B) is a flow chart showing generally the acts associated with communicated data between a remote access device and a base device in accordance with the present invention.
Figure 7B:
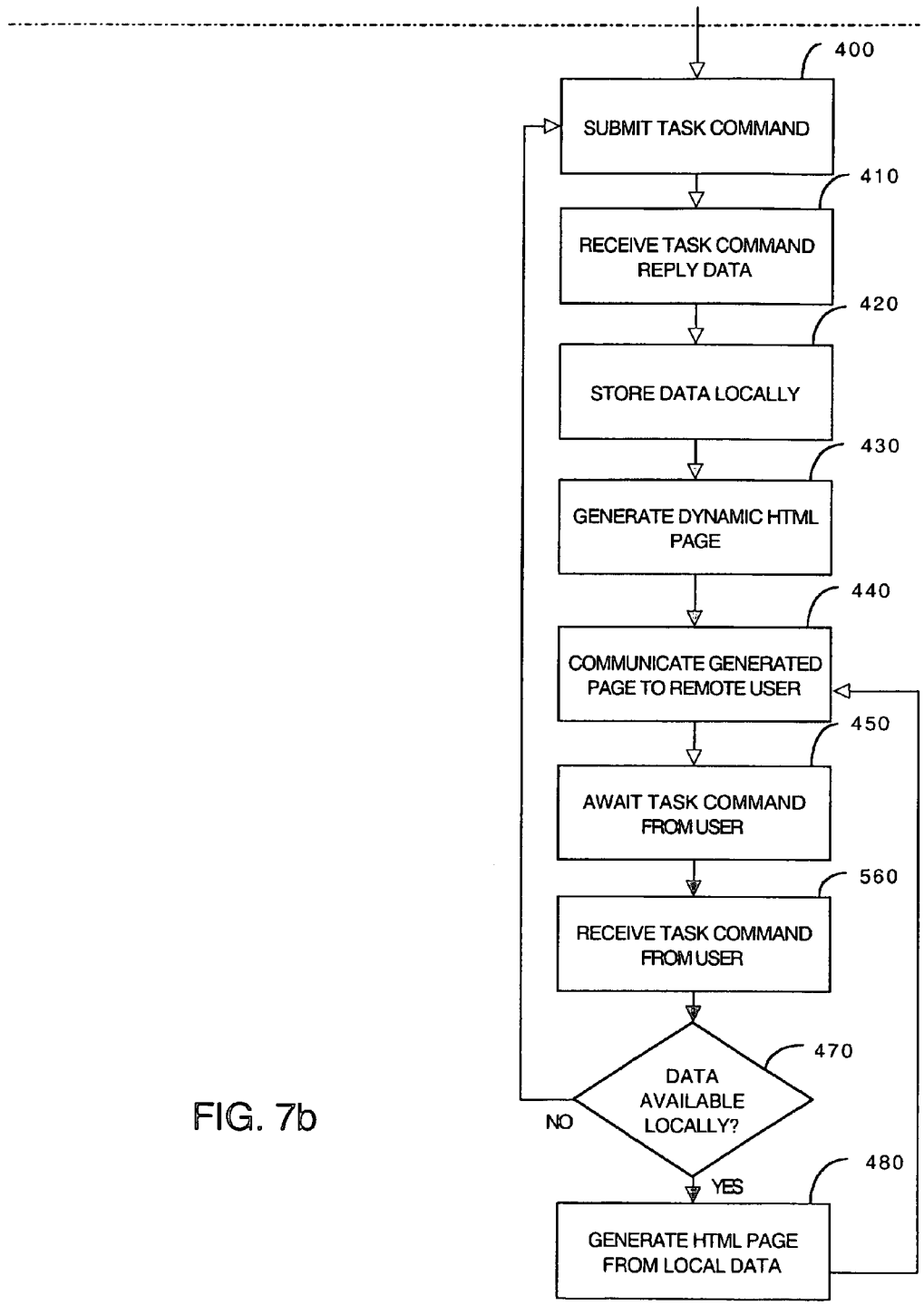

Database server 14 further has loaded in its RAM conventional database software (not shown) such as Oracle®, IBM® DB2, Microsoft SQL® or other appropriate database software for storage, update and retrieval of system user data, and as described more fully below in the operation of the user server modules (FIG. 7). The account creation server 16 carries out the operation of defining new system user accounts and is described more fully below in conjunction with FIG. 2 and FIG. 5.

Each of servers 12, 14, 16, 22, 24, 26, 28, 30 may further comprise a server farm, rather than a single server as is known in the art. For example, computer user server 22 may comprise a cluster (or plurality) of computer user servers. In the preferred embodiment, each of the user server modules 22, 24, 26, 28 comprise server farms. Where each user server module is structured and configured as a server farm, the system further provides a load balancing module (depicted in FIG. 3) in the main web server 12. The load balancing module of the invention is described in more detail below in conjunction with FIG. 3 and FIG. 6. The main web server 12 may also comprise a server farm to provide robustness to the system 10 when a plurality of remote access devices are accessing the system 10 concurrently.

The system's network connection 20 is operatively coupled to an Internet terminal adapter 32 for providing access to the global information network, known as the Internet 36. The terminal adapter 32 provides a serial connection to an Internet Service Provider (ISP) 34 or other Internet backbone and couples the system 10 to the Internet 36.

The system 10 may be operatively coupled with one or more remote access is devices (not shown) via the Internet 36. Such remote access devices may be conventional computers (including desktop, portable notebooks, and palmtop computers), mobile telephone devices (such as cellular and PCS (personal communications service) phones), personal digital assistants (such as Palm Pilot™ or Windows CE™), and other Internet appliance devices (such as WebTV™). In general, a remote access device which may communicate over the Internet and is capable or viewing Web pages is suitable of communication with the system 10.

The system 10 may further be operatively coupled with one or more "base" devices (not shown) via the Internet 36. The base devices typically connect to the Internet using conventional connection means, such as dial-up, cable, or network connections, for example. Each base device contains or provides an access gateway to information which is provided to the user of the remote access device. Such information may include, for example, computer files such as address book files, document files, email documents, among others. Each base device is identified with a user of the remote access device via conventional authentication means, such as challenge and response authentication. For example, when a remote user provides a user name and password to the system 10, the system 10 then identifies the base device which the user is entitled to access.

Figure 8:
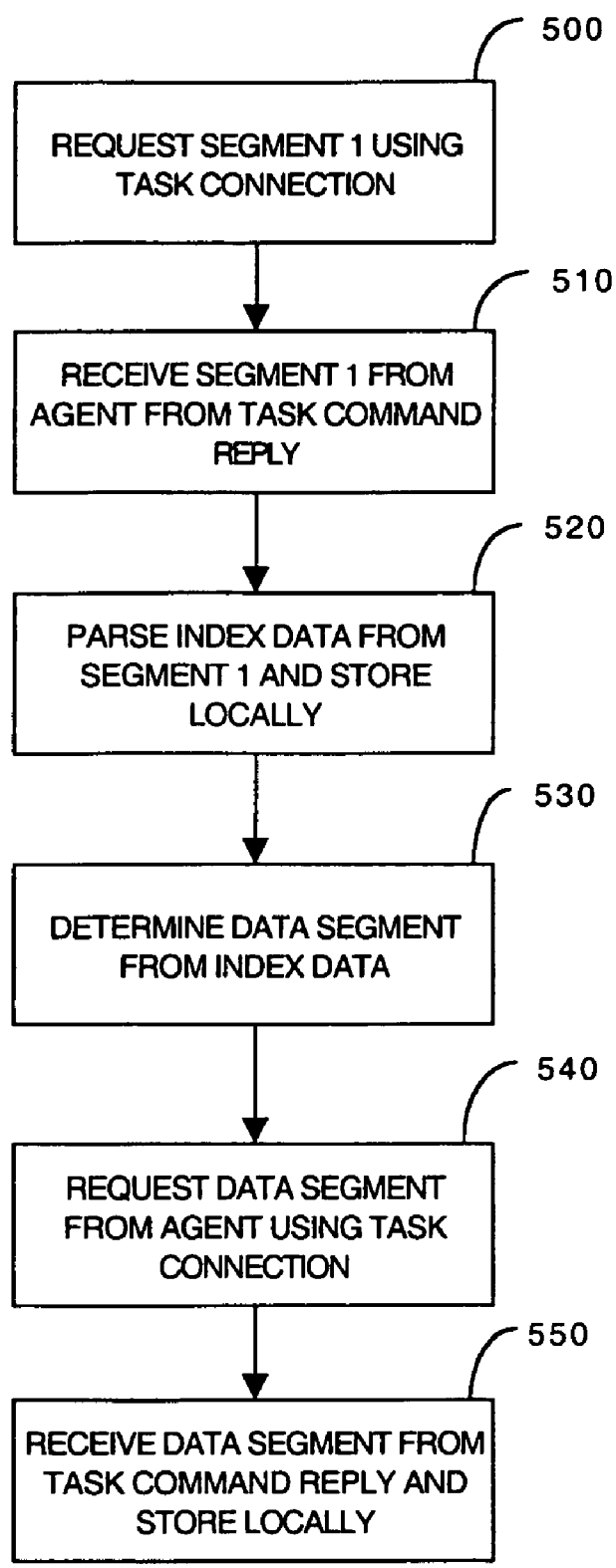
FIG. 8 is a flow chart showing generally the acts associated with a segmented read sequence in accordance with the present invention.
Figure 9:
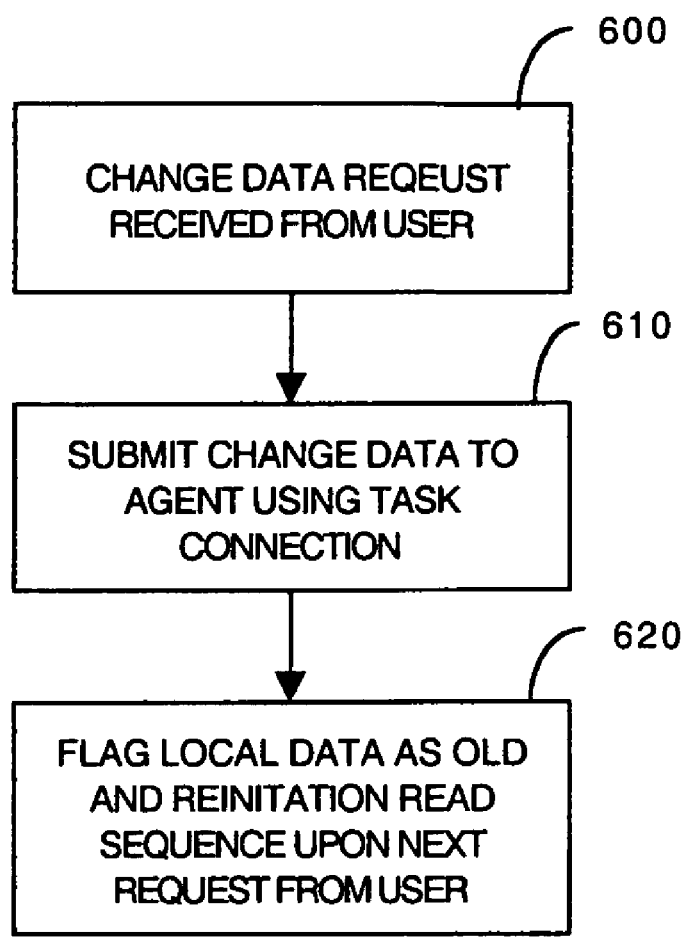
FIG. 9 is a flow chart showing generally the acts associated with a write sequence in accordance with the present invention.

The base devices may be any conventional data processing means or computer suitable for communicating data to the user server modules 18 in accordance with the present invention and as described in further detail below (FIG. 7 through FIG. 9). The "base" device and its operation is described in copending application entitled "AGENT SYSTEM FOR A SECURE REMOTE ACCESS SYSTEM" having U.S. Pat. No. 6,892,225 and filed Jul. 19, 2000, the disclosure of which is expressly incorporated herein by reference.

In cases where a base device does not have a permanent (i.e., persistent or "full-time") connection to the Internet, the Sili server 30 is configured to "wake-up" the base device. Normally, this process is carried out when a user identified with the base devices is accessing the system 10 via a remote access device. Accordingly, the system 10 may be further coupled to the base devices via the Sili server 30. The Sili server 30 is coupled to a modem pool 38 which may comprise a bank or pool of modems as is known in the art. The Sili server 30 is configured to dial the base device by calling a phone number designated for the base device via PSTN (public switched telephone network) 40 and negotiate a connection between the base device and Sili server 40 via the Internet. During negotiation, the Sili server 30 typically identifies the identity (or location such as the IP address) of the Sili server 30, and then terminates the PSTN 40 connection. In response, the base device then carries out the operation of connecting to the Internet and communicating with the Sili server 30 over the Internet connection. Once connected with the Sili server 30 via the Internet (whether permanently or as requested during the above described "wake up" process), the Sili server 30 then communicate which user server module is requesting data from the base device. Further processing is carried out between the designated user server module and the base device as described below in conjunction with FIG. 4 and FIG. 7.

Figure 2:
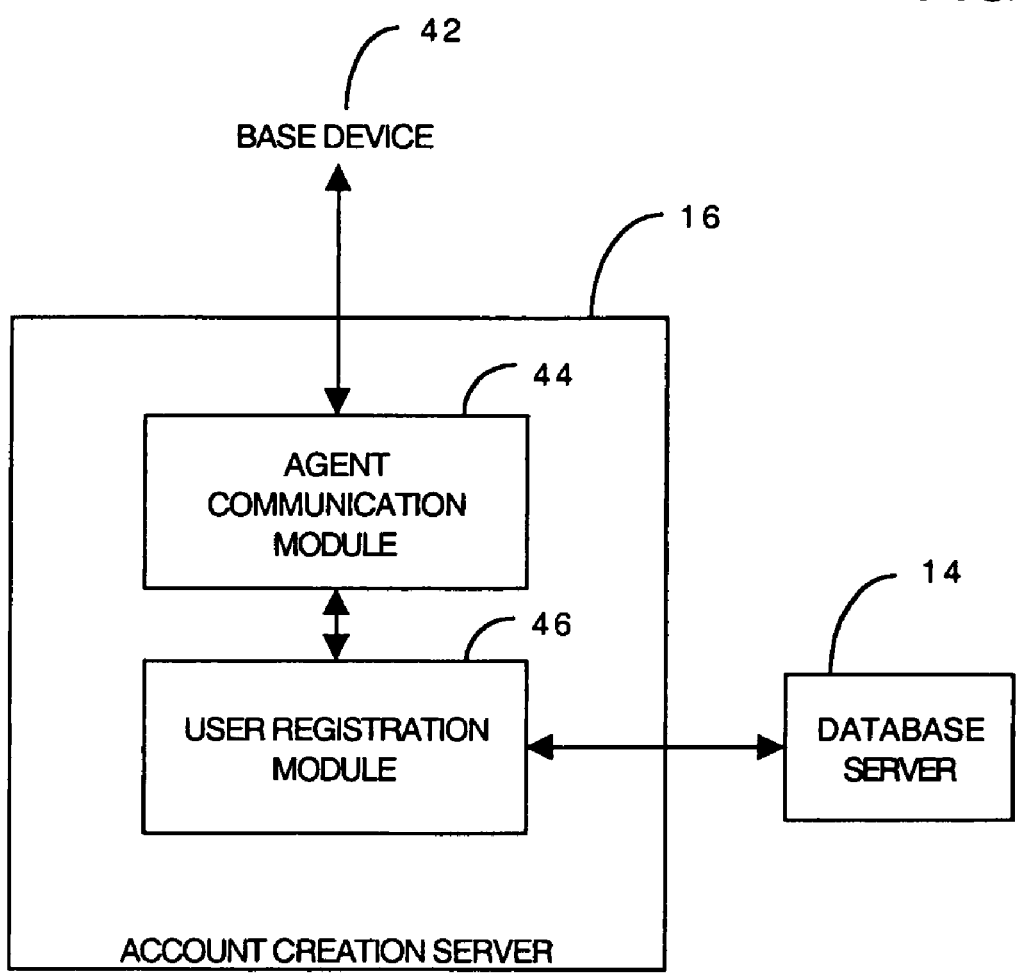
FIG. 2 is a functional block diagram showing an account creation server module in accordance with the present invention.

Referring next to FIG. 2, as well as FIG. 1, there is shown a block diagram of the account creation server 16 according to the present invention. The account creation server 16 includes an agent communication module 44 operatively coupled to a user registration module 46, each operating in RAM. The agent communication module 44 is further coupled for communication to the base device 42 via conventional connection means, such as via the Internet or a modem connection. In general, a user of the system registers to provide access to information on (or coupled to) the base device 42. For example, a user may register to provide access to a home computer (base device). Another example is where a corporate user registers to provide access to one or more office computers. After registration, the user is able to access data on the base device via various remote access devices.

The account agent communication module operates using user data provided by the base device 42. During registration of a user, the base device 42 communicates to the account creation server 16 the user's name, password, IP address of the base device, modem phone number of the base, among other user data such as name, sex, birthday, email, email password, email client, zip code, for example. The agent communication module 44 receives this user data and provides the user data to the user registration module 46 for further processing. The user registration module 46 receives the user data and creates an "account" for the user by storing the user data into the database server 14. When the user later accesses the system 10 via a remote access device, the user's credential may be verified according to the user's name and password, and the IP address and/or modem phone number of the base device identified with the user may be ascertained from the database 14. Access to information on (or coupled to) the base device may thereafter be provided to the user of the remote access device.

Figure 3:
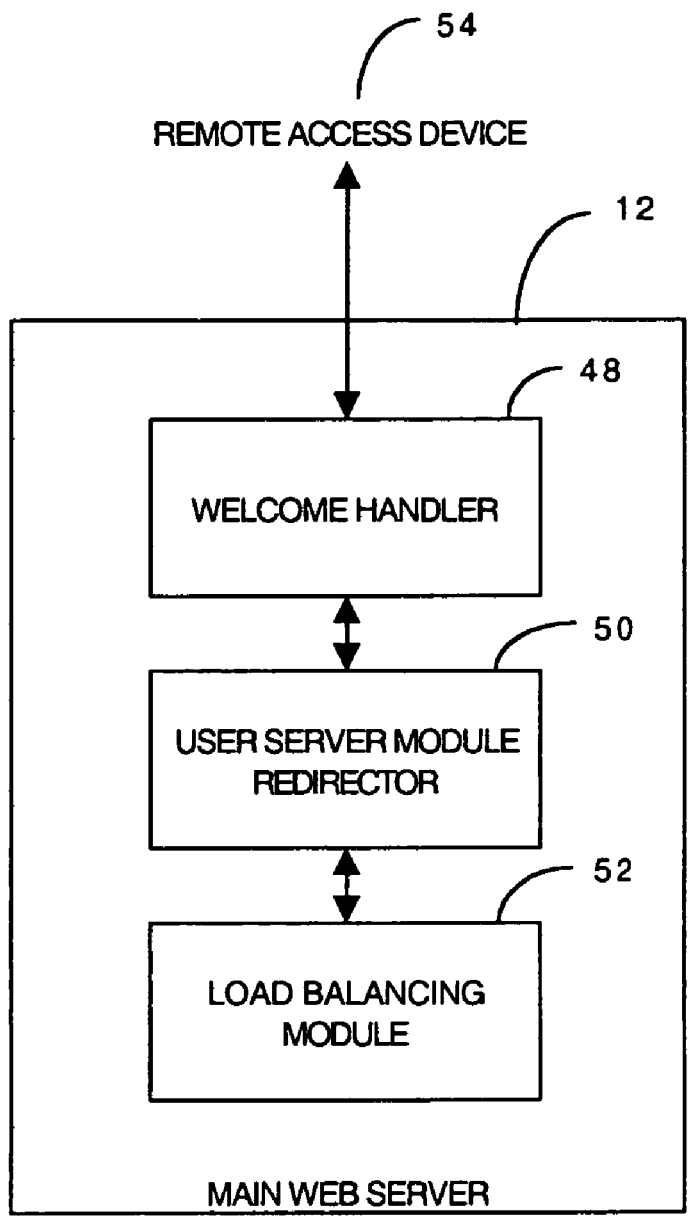
FIG. 3 is a functional block diagram showing a web server module in accordance with the present invention.

Referring now to FIG. 3, as well as FIG. 1 and FIG. 2, there is shown a block diagram of a main web server 12 in accordance with the present invention. As noted above, the tasks carried out by the web server 12 may be carried out by a server farm comprising a plurality of web servers, each configured substantially as described herein for main web server 12.

Main web server 12 comprises a welcome handler module 48 coupled to a user server module redirector module 50, which is further coupled to a load balancing module 52. Each of the modules 48 through 52 operates within the RAM of the web server 12 to carry out the operations described herein.

The main web server 12 is operatively coupled to one or more remote access devices 54 (via the Internet) which are accessed by a user (remote user) of the system 10. As described above, the remote access device 54 may be any data processing means suitable for connecting to the Internet and viewing web pages. For example, the remote access device 54 may be a computer, mobile phone, PDA, or other Internet appliance device.

A user of the remote access device 54 typically initiates communication with the system 10 by connecting to the main web server 12 and requesting a web page (via conventional http requests). The welcome handler 48 receives this user request and determines, among other things, the type of device the user is using. This determination is typically carried out by inspecting the request string communicated by the remote access device 54 and determining the browser type field in the request string. In general, the browser type field identifies the browser version including the hardware platform (i.e., the device type). Using the data in the request string, the welcome handler 48 identifies the device type and communicates the device type to the user server module redirector module 50 for further processing.

The user server module redirector 50 receives the device type from the welcome handler 48 and then queries the load balancing module 52 to determine the appropriate user server module 22 through 28 to which the remote user is redirected.

The load balancing module 52 carries out an enhanced user server module designation algorithm which overcomes disadvantages in the prior art. Prior art load balancing allocates resources on a request by request basis without regard to who is making the request, and therefore resources of a plurality of machines may be delegated to a single user. In contrast, the load balancing module 52 allocates user server module designation on a user by user basis, rather than based on requests. Thus, a user is designated a particular user server module 18. Requests made by the same user are directed to the same user server module during a "session" defined for the user.

A session is defined for a user when the user initiates a first request the system 10. The session remains active and further requests are identified with the same session, until either the user signs out (logs off) or a predefined period of inactivity has elapsed, such as when the user has not made any requests within a predetermined timeout period (e.g., 30 minutes).

According to this algorithm, the load balancing module 52 designates a user server module within each server farm according to usage on a session (or user) basis, rather than on a request basis. If, for example, the remote access device type is determined by the welcome handler 48 to be a mobile phone, the load balancing module 52 designates a mobile phone user server 24 from the servers in the mobile phone user server farm according to session usage (or user usage). This designation is then communicated to the user server module redirector 50.

The user server module redirector 50 receives the user server module designation from the load balancing module 52 and transmits a command (typically an "http redirect" command) to the remote access device 54 which redirects the remote access device 54 to the designated user server module.

Figure 4:
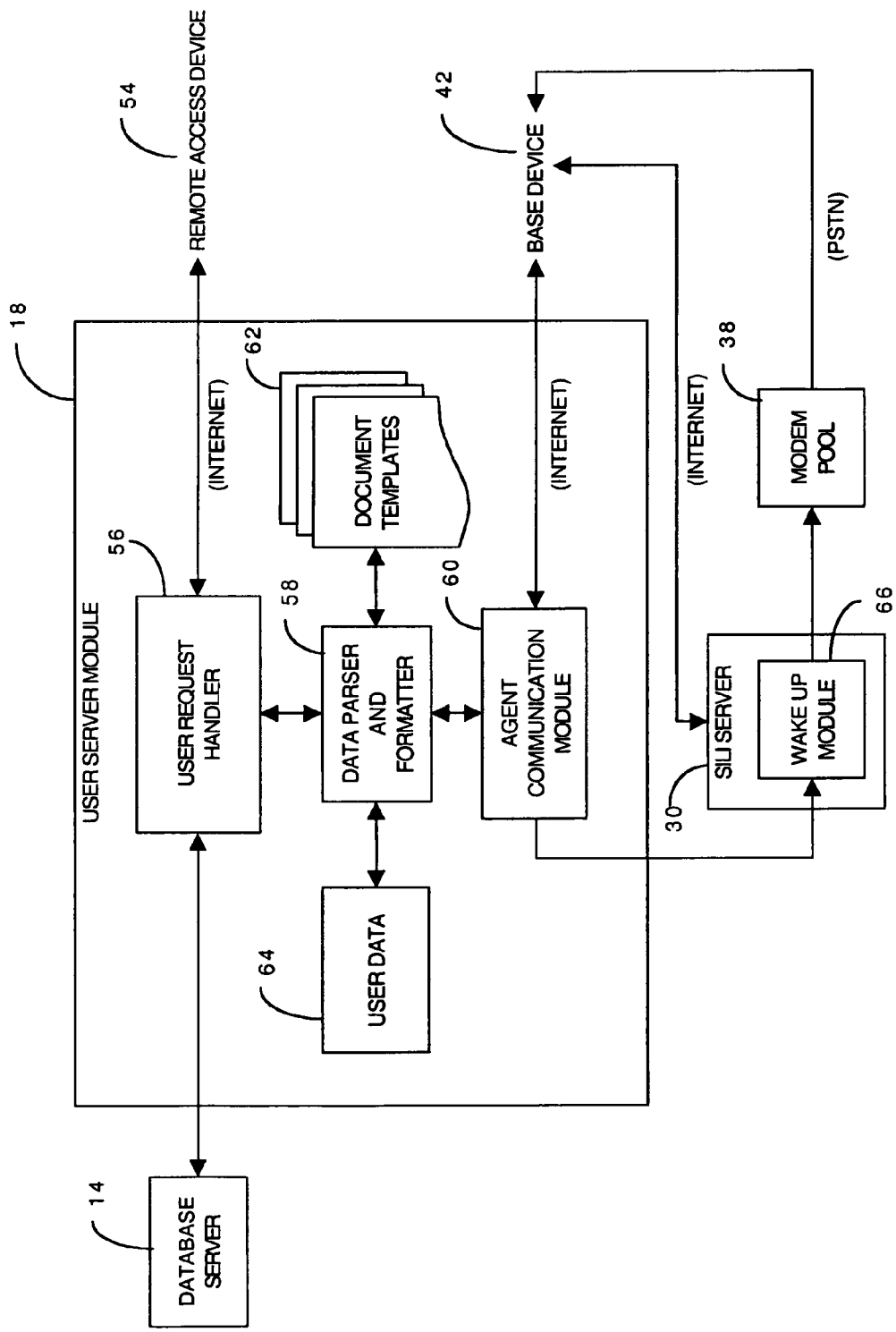
FIG. 4 is a functional block diagram showing a user server module in accordance with the present invention.

Referring now to FIG. 4, as well as FIG. 1 through FIG. 3, there is shown a block diagram of a user server module 18 according to the present invention. User server modules 22 through 28 are configured substantially as user server module 18 described herein. User server modules 22 through 28 differ from each other in that the data formatted communicated to the remote access device according to the remote access device type and as defined in the document templates described below. In its broadest description, the user server module 18 provides a user of a remote access device access to data on a base device via an open standard remote access platform such a web browser. The user server module 18 also provides means for formatting data according to the device type of the remote access device. In addition, the user server module 18 provides a secure means for retrieving requested information from the base device via requests which are initiated by the base device, rather than by the user server module 18.

The user server module 18 comprises a user request handler module 56, a data parser/formatter module 58, an agent communication module 60, a plurality of document templates 62 and a user data module 64. The user request handler module 56 is operatively coupled to the remote access device 54 via the Internet and the database server via conventional networking means. The user request handler module 56 is also coupled for communication to the data parser/formatter module 58. The user request handler 56 carries out the operation of receiving and responding to requests from users (accessing the remote access devices 54). The user request handler 56 also verifies the users access credentials using conventional authentication means, such as challenge and response authentication. For example, in the illustrative example module 18, the user request handler 56 verifies the user's access credentials by querying the database server 14 and verifying the user's name and password. This verification is normally carried out when the user is first redirected to the user server module 18 by the main web server 12. Once this verification is established a "session" is maintained for the user, as described above.

The user request handler 56 also forwards user requests to the data parser/formatter 58 (for further processing) and receives formatted documents from the data parser/formatter 58 for communication to the remote user at the remote access device 54. The communication between the user request handler 56 and the remote access device 54 may be carried out over a secure connection, such as secure sockets layer, but may also carried out over a conventional http connection.

The data parser/formatter module 58 is further coupled to the agent communication module 60, the user data module 64 and the set of document templates 62. The data parser/formatter 58 receives user requests from the user request handler 56. User requests typically comprise requests to view, read, write, modify, or delete data on a base device 42, which is operatively coupled to the user server module 18 via the agent communication module 60. The base computer 42 is identified with the user of the remote access device 54 during the authentication of the user, using information provided by the user during registration (as described above in conjunction with FIG. 2).

When the data parser/formatter 58 receives a particular user request, the requested information may be in the user data module 64, which is a conventional data storage facility maintained during the current session of the user. Data may be in the user data module 64 if the same information had been previously requested in the same session. However, data in the data module 64 is purged when the session is terminated (which may occur upon the user log out or upon the expiration of a predetermined session timeout period). If the data requested is not in the user data module 64, the data parser/formatter 58 requests the data from the base computer 42 via the agent communication module as described further below. The requested data is then provided from the agent communication module 60 to data parser/formatter 58, which stores the data in the user data module 64 for prospective requests.

The data parser/formatter 58 then formats the requested data (either obtained from the user data module 64 or from the base device 42 via the agent communication module 60) and merges the data with one of the document templates 62. The document templates 62 are provided in different "formats" according to the remote access device type and according to the request type. For example, the documents templates 62 for the computer user server 22 provides document formats appropriate for viewing on a conventional computer device (i.e., more complex objects such as frames, images, scripting, sound, for example). Likewise, the documents templates 62 for the mobile phone user server 24 provides document formats suitable for viewing on a mobile phone device (e.g., fewer complex objects, such as primarily text-oriented formats).

Additionally, different formats of document templates 62 are provided according to the request type (and the type of content to view viewed). For example, if the user is requesting to view the user's e-mail inbox, the appropriate objects and formats are provided to facilitate viewing of the user's e-mail inbox (e.g., icons for the address book, icons for messages, icons for sending a new message). If, on the other hand, the user is requesting to view the user's drive directory, the appropriate objects and formats are provided to facilitate view of the user's directory structure (e.g., folder icons to represent directories, expanding tree objects to view sub-directories). Other formats and objects are further defined in the document templates 62 to provide viewing of data according to the requesting device type.

As depicted in FIG. 4, the agent communication module 60 is further coupled for communication to the Sili server 30 and configured to be coupled with the base device 42. For example, when the agent communication module 60 receives a request for data in a base device 42, the agent communication module 60 transmits a request ("connection request") to the Sili Server 30 for the base device 42 to the connect to the particular user module 18. In response the Sili Server 30 communicates to the base device that the user module 18 has a pending job request as described herein.

The Sili server 30 is configured to be coupled with the base device 42 via the Internet (although the invention may be also be carried out where the base device 42 and the Sili server 30 are coupled using other connection means, such as a direct serial connection, for example). In the case where the base device 42 maintains a "full time" (or permanent) connection to the Internet, the Sili server 30 and the base device 42 periodically communicate signals back and forth.

Preferably, communications between the base device 42 and the Sili server 30 are initiated by the base device 42. For example, a base device 42 which maintains a full time Internet connection is generally configured to periodically communicate "job request" commands at a predetermined interval (e.g., forty (40) seconds) to the Sili server 30. In response, the Sili server 30 may indicate "no job" or "job request by a user server module". "No job" is communicated where the user associated with the base device 42 is not requesting data at this time. "Job request by a user sever module" is communicated when the user associated by the base device 42 is requesting data (which is indicated to the Sili server 30 by the agent communication module 60 as noted above). Where the Sili server 30 indicates that a job request is pending, the Sili server 30 also identifies the particular user server module (22 through 28), normally by identifying the IP address of the particular user server module.

If the base device 42 does not maintain a full-time Internet connection, further processing may be required to establish a communication between the Sili server 30 and the base device 42 over the Internet. The Sili server 30 may readily determine whether a particular base device 42 maintains a full time Internet connection by checking whether the base device 42 communicates periodic "job request" commands as described above. Where the base device 42 does not maintain a full-time connection to the Internet, the invention provides means for signaling the base device 42 to establish an Internet connection and connect to the Sili server 30.

In the present illustrative embodiment shown in FIG. 1 and FIG. 4, the Sili server 30 comprises a "wake up" module 66 which operates in RAM. The Sili server 30 is further coupled to a modem pool 38 having means for connection via the PSTN 40. When the Sili server 30 receives a connection request from a user server module 18 for a particular base device 42 which does not maintain a full-time Internet connection, the wake up module 66 connects to the base device 42 by dialing the phone number of the base device 42 through the modem pool 38 (and PSTN 40) and indicating that connection to the Sili server 30 via the Internet is requested. The phone number of the base device 42 may be readily obtained from the database server 14. If necessary, the IP address of the Sili server 30 may also be conveyed to the base device 42. After communicating this information to the base device 42, the Sili server 30 terminates its connection via the modem pool 38. Responsive to the wake up command from the Sili server 30, the base device 42 establishes a conventional connection to the Internet (normally via an ISP) and thereafter communicates job request commands to the Sili server 30.

Referring again to the agent communication module 60 in FIG. 4, when the agent communication module 60 receives a request for data in a base device 42, the agent communication module 60 transmits a request ("connection request") to the Sili Server 30 for the base device 42 to the connect to the particular user module 18, as noted above. In response, the Sili Server 30 communicates to the base device 42 that the user module 18 has a pending job request, by responding to a "job request" command from the base device 42 with a "job request by a user server module" response and indicating the IP address of the particular user server module. The base device 42 receives the "job request by a user server module" response and thereafter communicates with specified user server module while the associated "session" is active. Once, the session is terminated, the base device 42 either reestablishes its connection with the Sili server 30 (communicating job request commands) or terminates its connection with the system 10 and the Internet. The base device 42 reestablishes its connection with the Sili server 30 at the end of the session if the base device 42 is configured for a full-time Internet connection. Otherwise, it terminates its connection with system 10 and the Internet.

When the base device 42 receives the "job request by a user server module" response from the Sili server 30, it begins communication with specified user server module, and more particularly the agent communication module 60 in the specified user server module. Preferably, communication between the agent communication module 60 and the base device 42 is initiated by the base device 42, using a task connection request. For example, the preferred sequence of communication comprises a task connection request communicated from the base device 42 to the agent communication module 60. This task connection request communication opens a communication socket between the base device 42 and the agent communication module 60. If the agent communication module 60 has pending requests (e.g., received from the data parser/formatter 58) the agent to communication module 60 communicates a task command reply in response to he task connection request. The task command reply may indicate the data requested from the base device 42, such a directory listing, or a transaction (e.g., send or delete), for example. Responsive to the task command reply, the base device 42 provides the requested information to the agent communication module 60 or carries out the requested instruction. Additional request may be carried out by the agent communication module 60 by transmitting further task commands to the base device using the open communication socket.

As described above, communication sequences between the system 10 (Sili server 30 and user server module 18) and the base device 42 are generally initiated by the base device 42, rather than the system 10. The exception is where the Sili server 30 initiates a wake-up sequence as described above. However, for data transfers and key operations (such as file transaction), communications are initiated by the remote device. This arrangement provides several advantages which overcomes problems associated with the prior art. First, security is increased since the data communications are initiated by the base device rather than by the system 10. By requiring the base device to initiate communication (and therefore establish a connection socket), hacking into the base device from the outside becomes a more difficult task. Additionally, the invention may be practiced even if the base device is behind firewall because the base device initiates communication and opens the connection to the agent communication module, thereby allowing reply communications and task commands to be communicated from the agent communication module.

The communication between the base device 42 and the system 10 (sili server 30 and agent communication module 60) are preferably carried out over a secure connection utilizing for example, 128-bit encryption. Additionally, a private (non-public) communication may be provided by the system as a communication means between the system 10 and the base device 42 as is known in the art.

As noted above, the data parser/formatter 58 carries out the operation of requesting data from the base device 42 via the agent communication module 60 and storing "session" data in the user data module 64 during the active session. Where the data requested from the base device 42 is stored in a substantially large file (e.g., greater than one megabyte), the data parser/formatter 58 further carries out the operation of segmenting the file and requesting only the portion of the file having the requested data. For example, e-mail mailbox files generally grow in size over time. The user, however, may only be requesting one particular message, rather than all the messages in the mailbox. Accordingly, it would be inefficient to transfer the entire mailbox file, when only a portion having the requested message is requested. The details of carrying out segmentation with the base device 42 are described more fully below in conjunction with FIG. 8 and FIG. 9.

The method and operation of invention will be more fully understood with reference to the flow charts of FIG. 5 through FIG. 9, as well as FIG. 1 through FIG. 4. The order of actions as shown in FIG. 5 through FIG. 9 and described below is only exemplary, and should not be considered limiting.

Figure 5:
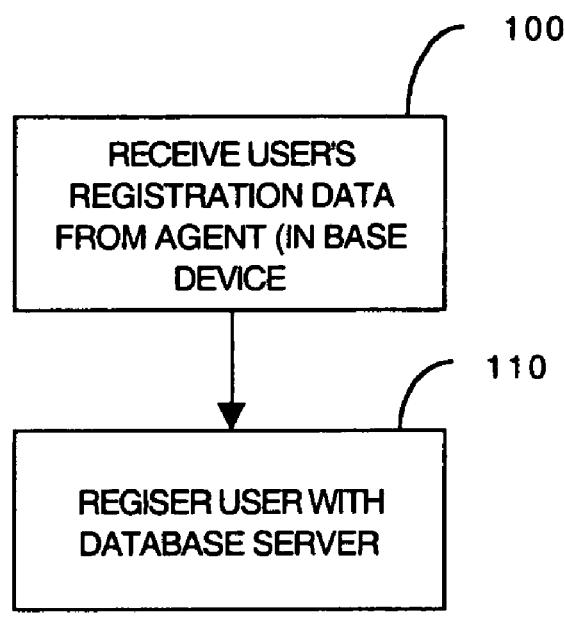
FIG. 5 is a flow chart showing generally the acts associated with registering a user in accordance with the present invention.

Referring now to FIG. 5, as well as FIG. 1 through FIG. 4, the acts associated with registering a user in accordance with the present invention are generally shown. In general registration of a user is communicated by the user from the base device 42, wherein the user is establishing a user name, password, the information (e.g., phone number, IP address) about the base device which the user is enabling for remote access.

At box 100, the account creation server 16 receives the registration data from the base device 42. The registration data includes such information as user name, password, base device phone number, base device IP address, which identifies the user (via user name and password) with the particular base device (via phone number and/or IP address). Box 110 is then carried out.

At box 110, the account creation server 16 stores the registration data received in box 100 into the database server 14 using conventional database commands as is known in the art. The registration data, once stored in the database server 14, may be accessed to verify a user attempting to remotely access the base device.

Referring now to FIG. 6, as well as FIG. 1 through FIG. 5, the acts associated with redirecting a remote access user to a user server module 22 through 28 in accordance with the present invention are generally shown. Remote users generally access system 10 via the Internet 36 and a remote access device capable of connecting to the Internet and viewing web pages (such as a to web browser). The remote users initiate communication with the system 10 by transmitting a conventional http request to the main web server 12 via the URL address of the main web server 12.

At box 200, the welcome handler 48 in the main web server 12 receives the http (initial entry) request transmitted from the remote device by the remote user. Box 210 is then carried out.

At box 210, the welcome handler 48 determines the type of remote access device the remote user is accessing. As described above, this determination is typically carried out by inspecting the request string communicated by the remote access device 54 and determining the browser type field in the request string. In general, the browser type field identifies the browser version including the hardware platform (i.e., the device type). Using the data in the request string, the welcome handler 48 identifies the device type and communicates the device type to the user server module redirector module 50 for further processing. Diamond 220 is then carried out.

At diamond 220, the user server module redirector 50 receives the device type from the welcome handler 48 and then queries the load balancing module 52 to determine the appropriate user server module 22 through 28 to which the remote user is redirected. The load balancing module 52 determines whether an session is currently active for the particular user by inspecting a local data record of sessions. If a session is currently active for the user, box 230 is then carried out. Otherwise, Box 240 is carried out.

At box 230, the current user is already associated with an active session (and user server module). Box 250 is then carried out to redirect the user to the appropriate user server module.

At box 240, the current user is not associated with an active or existing session. The load balancing module 52 assigns a session to the current user and designates a user server module to the session according to the remote device type and the current allocation of sessions within the user server module farm for the remote device type. For example, if the remote device type is determined to be a mobile phone, the load balancing module 52 assigns a user server from the mobile phone user server farm 24. The server in the mobile phone user server farm 24 which has the least assigned sessions is generally designated the current session. Box 250 is then carried out.

At box 250, the user server module redirector 50 redirects the remote user (via http commands) to the designated server. As described further below, subsequent requests from the remote user to the system 10 will be directed to the designated server while the current session remains active. Process 260 is then carried out.

At process 260, communication sequence between the designated user server module and the remote device begins. This process is described more fully below in conjunction with FIG. 7.

Referring now to FIG. 7, as well as FIG. 1 through FIG. 6, the acts associated with communicated data between a remote access device and a base device by the system 10 in accordance with the present invention are generally shown. This process is carried out after the remote access device is designated a user server module as described above for FIG. 6.

At box 300, the designated user server module (generally designated as 18) process begins, normally after URL (or IP) redirection by the main web server 12. After initial redirection, the user request handler 56 in the user server module 18 provides a web page (login screen) requesting the remote user's access credentials (normally a user name and password). The format/layout for the login screen may be provided by the data parser/formatter 58 and document templates 62 or may alternatively be a standard document produced by the user request handler 56. Box 310 is then carried out.

At box 310, the user request handler 56 receives the access credential's of the remote user from the remote access device and verifies the information by querying the database server 14 using conventional database requests. Diamond 320 is then carried out.

At diamond 320, the user request handler 56 determines whether the access credentials provided by remote user matches information in the database server. If so, the user is authenticated and box 340 is carried out. Otherwise, the user was not verified and box 330 is carried out.

At box 330 the user's access credentials were not verified. The user request handler 56 may provide additional attempts for the user to provide the correct access credentials by providing another login screen. Box 310 is then repeated.

At box 340, the user's access credentials were authenticated. The user request handler 56 refreshes the remote user's screen by transmitting a "main" or "menu" page providing the user with a plurality of options, such as transmitting or viewing a file, for example. Diamond 350 is then carried out.

At diamond 350, the agent communication module 60 communicates with the Sili server 30 to determine whether base device corresponding to the current user is currently connected to the system 10 via the Internet. As noted above, some base device may have full-time Internet connections, in which case the base device is periodically communicating with the Sili server 30 as described above (see FIG. 4). Since a session is currently active, the Sili server 30 communicates a "job request for user server module" command indicating the address of the designated user server module 18 to the base device in response to a "job request" transmission from the base device.

Base devices which do not have full-time Internet connections must be signaled to connect to the system 10 (also described above in conjunction with FIG. 4). If the base device is currently communicating with the Sili server 30, box 370 is carried out. Otherwise box 360 is carried out.

At box 360, the "wake-up" sequence is initiated wherein the Sili server 30 dials the designated number for the base device via the PSTN 40 as described above in FIG. 4. The Sili server 30, among other things, requests the base device to connect to the Internet and thereafter connect to the Sili server 30. The Sili server 30 then terminates its PSTN 40 connection. In response, the base device establishes an Internet connection (normally via a ISP) and thereafter connects to the Sili server 30. After the base device and the Sili server commence communication. The Sili server 30 communicates a "job request for user server module" command indicating the address of the designated user server module 18 to the base device in response to a "job request" transmission from the base device. Box 370 is then carried out.

At box 370, the user request handler 56 waits for a task command from the remote user, which is normally communicated from the remote access device to the user server module 18 via conventional http protocols, such as selecting an option from the web page provided by the user request handler 56 to the remote access device. As noted above, the communication between the remote access device and the user server module 18 may be a secure transaction with encryption (e.g., 128-bit encryption). Box 380 is then carried out.

At box 380, the remote user has communicated a task command to the user server module 18. This request is received by the user request handler 56. If the request is for the retrieval (e.g., viewing or listing) of information, the user request handler queries the data parser/formatter 58 for the information and box 390 is to carried out. If the request is to carry out or execute a command on the base device (to delete a file, for example), the request may be communicated directly via the agent communication module 60 to the base device, where the base device 42 carries out the instruction. As noted above, communication between the base device and the user server module is carried out via requests initiated by the base device. Where the request is to carry out a write (e.g., sending or changing a file on the base device) sequence, rather than read sequence, the write sequence is carried out as described in conjunction with FIG. 9.

At box 390, the agent communication module 60 awaits a task connection from the from the base device. As noted above, during the active session, the base device and the designated user server module 18 communicate via a (task connection) request initiated from the base device. Once this task connection request is received by the designated user server module 18, a socket connection is established and maintained by the user server module 18 during the active session. Thereafter, task commands may be issued by the user server module 18 to the base device. When the user server module 18 has a request pending for the base device, the user server module 18 communicates a task command reply in response to the task connection request from the base device. Accordingly, the agent communication module 60 awaits a task connection request from the base device. Box 400 is then carried out.

At box 400, the agent communication module 60 has received the task connection request form the base device (i.e., a connection socket is established) and transmits a task command. The task command indicates the requested data. Box 410 is then carried out.

At box 410, the agent communication module 60 receives from the base device task command reply data responsive to the task command issued by the user. The data is then communicated to the data parser/formatter 58 for further processing. Box 420 is then carried out.

At box 420, the requested data is stored into the user data module 64 by the data parser/formatter 58. This allows the data to be provided for subsequent requests during the active session. While resident in the user data module 64 during the active session. The data is deleted or otherwise purged when the session is terminated, as described above. Box 430 is then carried out.

At box 430, the data parser/formatter 58 merges the requested data with the appropriate document template 62 to generate a web page suitable for viewing on the remote access device. Box 440 is then carried out.

At box 440, the generated web page is communicated to the user request handler 56 for transferring to the remote access device. The web page is communicated using conventional http commands, and is provided as a reply to the task request command received from the user. Box 450 is then carried out for subsequent requests from the user.

At box 450, the user request handler 56 waits for a task command from the remote user. When a task command is received from the user, box 460 is then carried out.

At box 460, the remote user has communicated a task command to the user server module 18. This request is received by the user request handler 56. If the request is for the retrieval (e.g., viewing or listing) of information, the user request handler queries the data parser/formatter 58 for the information and diamond 470 is then carried out. If the request is to carry out or execute a command on the base device (to delete a file, for example), the request may be communicated directly via the agent communication module 60 to the base device, where the base device 42 carries out the instruction. As noted above, communication between the base device and the user server module is carried out via requests initiated by the base device. Where the request is to carry out a write (e.g., sending or changing a file on the base device) sequence, rather than read sequence, the write sequence is carried out as described in conjunction with FIG. 9.

At diamond 470, the data parser/formatter 58 determines whether the requested data is available locally (i.e., already stored in the user data module 64 from a previous transaction). If so, box 480 is carried out. Otherwise, box 400 is carried out.

At box 480, the requested data is available locally from the user data module 64. The data parser/formatter 58 merges the data with the appropriate document template 62 to generate a web page suitable for viewing on the remote access device. Box 440 is then carried out.

Referring now to FIG. 8, the acts associated with a segmented read sequence in accordance with the present invention is generally shown. This sequences may be carried out in conjunction the read sequence of FIG. 7 (Box 400 through 450) described above. Segmentation is appropriate where, for example, the requested information is only a portion of a larger file, such a where the requested information is a phone number entry in the user's address book. Other situations for segmentation will be readily apparent to those skilled in the art having the benefit of this disclosure.

At box 500, the data parser/formatter, instead of requesting the entire file, requests a file segment, and more particularly segment one (1) of the file. As is known in the art, segment 1 normally comprises such information as the data structure (index) for the file, and reference offsets to data within the file. Segment 1 is generally requested when not already resident in the user data module 64. Once segment 1 of a file is in the user data module 64, subsequent requests for other segments (box 530 and 540 below) of the same file may be carried out without requesting segment 1. As with other requests, this task command is submitted during the active session once the connection socket is open. Box 510 is then carried out.

At box 510, the agent communication module 60 receives the requested segment 1 and communicates the file segment 1 to the data parser/formatter 58 for further processing. Box 520 is then carried out.

At box 520, the data parser/formatter 58 inspects segment 1 and stores the data locally within the user data module 64. As noted above, once segment 1 of a file is in the user data module 64, subsequent requests for other segments (box 530 and 540 below) of the same file may be carried out without requesting segment 1 from the base device. Box 530 is then carried out.

At box 530, the data parser/formatter 58 determines which data segment ("requested segment") from the original file contains the data requested by the user. The data parser/formatter then requests this agent communication module to retrieve the "requested segment". Box 540 is then carried out.

At box 540, a task command to retrieve the "requested segment" is communicated by the agent communicated module 60 to the base. Box 550 is then carried out.

At box 550, the "requested segment" is received from the base device in reply to the task command of box 540. This data in the requested segment is stored locally in the user data module 64 and web page generally is then carried out normally as described above in conjunction with box 450 of FIG. 7.

Referring now to FIG. 9, the acts associated with a write sequence in accordance with the present invention are generally shown. This sequence is generally carried when requested by the user as described above in box 380 or box 460 of FIG. 7.

At box 600, a change data request is received from the user (box 380 or box 460, FIG. 7). The request may be to update a phone book entry, for example. Box 610 is then carried out.

At box 610, the change data request is communicated by the agent communication module 60 to the base device. As with other requests, this task command is submitted during the active session once the connection socket is open. Box 620 is then carried out.

At box 620, if the data change affect information which is also stored in the user data module 64, the information in the user data module 64 is flagged as "old". Accordingly, when a subsequent request is made for the information, the read sequence with the base device is carried out again, since the information in the user data module 64 is considered outdated.

Accordingly, it will be seen that this invention provides a method and apparatus which provides for remote and secure access to a host computer, and which further provides an open application standard for client access to the host computer.

Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A system for providing access to a base device identified with a user of a remote client device, said remote access system comprising:
   a) a web server operatively coupled for communication with the remote client device accessed by the user; and
   b) a user server operatively coupled to said web server and said remote client device, said user server further configured to communicate data between the base device and the user of the remote client device, said user server further configured to communicate data with said base device via requests initiated by said base device.

2. The remote access system of claim 1, wherein said data communicated to the remote client device is formatted for viewing by a web browser.

3. The remote access system of claim 1, wherein said data communicated to the remote device is further formatted for viewing on a personal computer.

4. The remote access system of claim 1, wherein said data communicated to the remote device is further formatted for viewing on a mobile telephone.

5. The remote access system of claim 1, wherein said data communicated to the remote device is further formatted for viewing on a personal digital assistant device.

6. The remote access system of claim 1, wherein said data communicated to the remote device is further formatted for viewing on an internet appliance device.

7. A method for providing access to a base device identified with a user of a remote client device, the method comprising the steps of:
   (a) operatively coupling a web server with the remote client device to allow communication between the web server and the remote client device;
   (b) operatively coupling a user server to said web server and said remote client device; and
   (c) communicating data between the base device and the remote client device via said user server from requests initiated by said base device.

8. A method for providing access to a base device identified with a user of a remote client device as recited in claim 7, further comprising a step (d) of allocating resources in the user server on a user by user basis.

9. One or more processor readable storage devices having processor readable code embodied on said one or more processor readable storage devices, said processor readable code for programming one or more processors to perform a method for providing access to a base device identified with a user of a remote client device, the method comprising the steps of:
   (a) operatively coupling a web server with the remote client device to allow communication between the web server and the remote client device;
   (b) operatively coupling a user server to said web server and said remote client device; and
   (c) communicating data between the base device and the remote client device via said user server from requests initiated by said base device.

10. One or more processor readable storage devices and processor readable code for performing the method of claim 9, the method further comprising a step (d) of allocating resources in the user server on a user by user basis.

* * * * *